US010824310B2

(12) United States Patent
Acharya et al.

(10) Patent No.: US 10,824,310 B2
(45) Date of Patent: Nov. 3, 2020

(54) AUGMENTED REALITY VIRTUAL PERSONAL ASSISTANT FOR EXTERNAL REPRESENTATION

(71) Applicant: SRI International, Menlo Park, CA (US)

(72) Inventors: Girish Acharya, Redwood City, CA (US); Rakesh Kumar, West Windsor, NJ (US); Supun Samarasekara, Princeton, NJ (US); Louise Yarnall, San Mateo, CA (US); Michael John Wolverton, Mountain View, CA (US); Zhiwei Zhu, Princeton, NJ (US); Ryan Villamil, Plainsboro, NJ (US); Vlad Branzoi, Lawrenceville, NJ (US); James F. Carpenter, Mountain View, CA (US); Glenn A. Murray, Jamison, PA (US)

(73) Assignee: SRI International, Menlo Park, CA (US)

( * ) Notice: Subject to any disclaimer, the term of this patent is extended or adjusted under 35 U.S.C. 154(b) by 390 days.

(21) Appl. No.: 14/313,578

(22) Filed: Jun. 24, 2014

(65) Prior Publication Data

US 2014/0310595 A1 Oct. 16, 2014

Related U.S. Application Data

(63) Continuation-in-part of application No. 13/721,276, filed on Dec. 20, 2012, now Pat. No. 10,573,037.

(51) Int. Cl.
*G06F 3/0484* (2013.01)
*G06T 19/00* (2011.01)
(Continued)

(52) U.S. Cl.
CPC ......... *G06F 3/04842* (2013.01); *G06F 9/453* (2018.02); *G06T 11/00* (2013.01); *G06T 19/006* (2013.01)

(58) Field of Classification Search
None
See application file for complete search history.

(56) References Cited

U.S. PATENT DOCUMENTS 6,230,132 B1 * 5/2001 Class ................. G01C 21/3608
704/270
7,925,049 B2 4/2011 Zhu et al.
(Continued)

FOREIGN PATENT DOCUMENTS

WO 2011028844 A2 3/2011

OTHER PUBLICATIONS

Cheyer et al., "A Unified Framework for Constructing Multimodal Experiments and Applications," Cooperative Multimodal Communication Lecture Notes in Computer Science, vol. 2155, 2001, pp. 234-242.
(Continued)

*Primary Examiner* — Nhat Huy T Nguyen
(74) *Attorney, Agent, or Firm* — Moser Taboada

(57) ABSTRACT

A computing system for virtual personal assistance includes technologies to, among other things, correlate an external representation of an object with a real world view of the object, display virtual elements on the external representation of the object and/or display virtual elements on the real world view of the object, to provide virtual personal assistance in a multi-step activity or another activity that involves the observation or handling of an object and a reference document.

28 Claims, 15 Drawing Sheets

(51) Int. Cl.
*G06F 3/16* (2006.01)
*G06T 11/00* (2006.01)
*G06F 9/451* (2018.01)

(56) References Cited

U.S. PATENT DOCUMENTS

| | | | |
|---|---|---|---|
| 8,174,568 | B2 | 5/2012 | Samarasekera et al. |
| 8,643,951 | B1* | 2/2014 | Wheeler ................. G06F 3/012 |
| | | | 359/630 |
| 2002/0191002 | A1* | 12/2002 | Friedrich ............. G05B 19/409 |
| | | | 345/632 |
| 2010/0103196 | A1 | 4/2010 | Kumar et al. |
| 2011/0084893 | A1* | 4/2011 | Lee ....................... G06F 1/1649 |
| | | | 345/6 |
| 2011/0138286 | A1* | 6/2011 | Kaptelinin .............. G06F 3/038 |
| | | | 715/728 |
| 2013/0114100 | A1* | 5/2013 | Torii ................... G06F 11/0733 |
| | | | 358/1.14 |
| 2013/0197899 | A1* | 8/2013 | Roulland ............ G06F 11/0733 |
| | | | 704/9 |
| 2013/0342568 | A1* | 12/2013 | Ambrus ................ G09G 3/003 |
| | | | 345/633 |

OTHER PUBLICATIONS

U.S. Appl. No. 13/866,509, filed Apr. 19, 2013, 46 pages.
U.S. Appl. No. 13/954,613, filed Jul. 30, 2013, 70 pages.
U.S. Appl. No. 13/966,665, filed Aug. 14, 2013, 65 pages.

* cited by examiner

AUGMENTED REALITY VIRTUAL PERSONAL ASSISTANT FOR EXTERNAL REPRESENTATION

GOVERNMENT RIGHTS

This invention was made in part with government support under NCR contract no. W91WAW-12-C-0063 awarded by the Army Contracting Command The United States Government has certain rights in this invention.

CROSS-REFERENCE TO RELATED APPLICATION

This application claims priority to and the benefit of U.S. patent application Ser. No. 13/721,276, filed Dec. 20, 2012, entitled "Method and Apparatus for Mentoring via an Augmented Reality Assistant," which is incorporated herein by this reference in its entirety.

BACKGROUND

In computer vision, mathematical techniques are used to detect the presence of and recognize various elements of the visual scenes that are depicted in digital images. Localized portions of an image, known as features, may be used to analyze and classify an image. Low-level features, such as interest points and edges, may be computed from an image and used to detect, for example, people, objects, and landmarks that are depicted in the image. Machine learning algorithms are often used for image recognition.

Augmented reality (AR) technology provides a real-time view of a physical, real-world environment in which the view is augmented with computer-generated virtual elements, which may include sound, video, graphics and/or positioning data. Some mobile computing devices provide augmented reality applications that allow users to see an augmented view of a surrounding real-world environment through a camera of the mobile computing device. One such application overlays the camera view of the surrounding environment with location-based data, such as local shops, restaurants and movie theaters.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
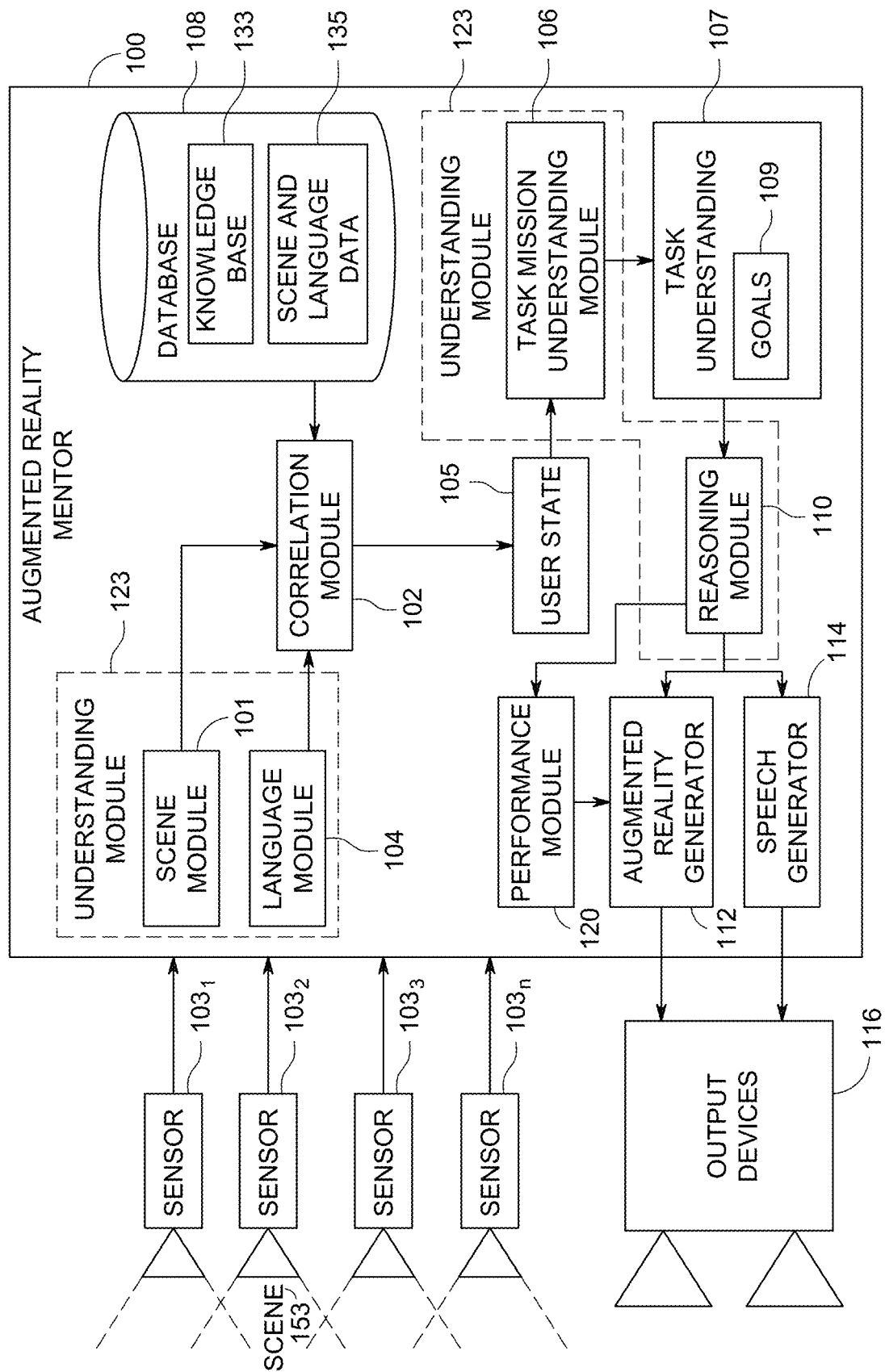
FIG. 1 depicts a simplified functional block diagram of at least one embodiment of a computing system for mentoring users in completing tasks.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

FIGS. 1-11 describe an illustrative embodiment of an augmented reality virtual assistant application that may be used for, among other things, training and mentoring users during operations for completing physical tasks. Embodiments of FIGS. 1-11 generally relate to mentoring and training users in completing complex physical tasks via an AR system. According to one embodiment, real-time video of a user performing a task is captured through a visual sensor such as a camera. The user also issues verbal communication which is captured by an audio sensor such as a microphone. The captured video and audio are correlated with each other and then a search is performed on a database, which can be local or remote, to determine the nature of the task and the user's current state. Once the task and the user's state are determined, a task understanding is generated with a set of one or more goals and the steps involved in reaching those goals. Steps, tips, or aids are displayed to the user by augmenting the real-time video feed from the visual sensor and projecting the overlaid feed onto a user display such as a head-mounted display or the like. The user's state dictates which steps towards a goal are overlaid on the display.

FIG. 1 depicts a functional block diagram of an embodiment of an AR mentor 100 for mentoring a user in completing complex physical tasks. In one embodiment, a plurality of sensors, $103_1$, $103_2$, $103_3$ to $103_n$, provide a video feed of a scene 153 in which a user of the AR mentor 100 is performing a task. The user's task may be repairing a vehicle, modifying a machine part, inspecting equipment, embedded in a learning environment, navigating terrain, machine training or any other task. The AR mentor 100 also provides users with operational and maintenance information regarding their task, mission, equipment and the like.

The AR mentor 100 comprises a number of computer-executable modules including a scene module 101, a correlation module 102, a language module 104, a task mission understanding module 106, a database 108, a reasoning module 110, an augmented reality generator 112, a speech generator 114 and a performance module 120. The sensors $103_1$ to $103_n$ are coupled to the AR mentor 100, particularly to the scene module 101 and the language module 104. According to some embodiments, a portion of the sensors $103_1$ to $103_n$ are video sensors coupled to the scene module 101 and a portion of the sensors $103_1$ to $103_n$ are audio sensors coupled to the language module 104. The AR Mentor 100 is further communicatively coupled to output devices 116. According to some embodiments, the output devices 116 comprise at least audio and video output devices such as speakers and a display. According to some embodiments, an output display is coupled with input video sensors and an output audio device is coupled with input audio sensors.

As described above, the scene module 101 receives a video feed from a portion of the sensors $103_1$ to $103_n$ and the language module 104 receives an audio feed from a portion of the sensors. The scene module 104 analyzes the video feed to identify objects in the scene 153 such as equipment, machine parts, vehicles, locations, and the like. The objects are stored in database 108. The scene module 101 extracts visual cues from the video feed to situate the user with respect to the world, including any equipment the user is being trained on. The exact relative position and head orientation of the user is tracked continually by a portion of the sensors $103_1$ to $103_n$. The visual cues and observed scene characteristics are used by the scene module 102 to understand user action and intents.

The language module 104 performs natural language processing on the received audio feed, augmenting the scene understanding generated by the scene module 102. The language module 104 is a is a real-time dialog and reasoning system that supports human-like interaction using spoken natural language. The language module 104 is based on automated speech recognition, natural language understanding, and reasoning. The language module 104 recognizes the user's goals and provides feedback through the speech generator 114, discussed below. The feedback and interaction occur both verbally and by engaging the augmented reality system to display icons and text visually on a user's display.

The function of the understanding block (the scene module 102 and the language module 104) is to take low-level sensor data (audio, visual and inertial) and determine intent (or user state 105) of a user in the context of well determined workflow for performing a complex task. As the user performs the task and progresses through the workflow, user intents are automatically generated by the understanding block and are communicatively coupled to the reasoning module 110 that determines the audio-visual guidance to be provided at the next instant.

The correlation module 102 correlates the scene and language data together, stores the scene and language data 135 is stored in database 108 and correlates the data into a user state 105, which according to some embodiments comprises a model of user intent.

According to an embodiment, the task mission understanding module 106 receives the user state 105 as input and generates a task understanding 107. The task understanding 107 is a representation of set of goals 109 that the user is trying to achieve, based on the user state 105 and the scene understanding in the scene and language data 135. A plurality of task understandings may be generated by the task mission understanding module 106, where the plurality of tasks form a workflow ontology. The goals 109 are a plurality of goals which may be a hierarchy of goals, or, a task ontology (e.g., steps that are to be completed for a task understanding to be considered complete). Each goal may have parent-goals, sub-goals, and so forth. According to some embodiments, there are pre-stored task understandings that a user may invoke such as "perform oil change", "check fluids" or the like, for which a task understanding does not have to be generated, but simply retrieved.

The task understanding 107 is coupled to the reasoning module 110 as an input. The reasoning module 110 processes the task understanding 107, along with task ontologies and workflow models from the database 108, and reasons about the next step in an interactive dialog that the AR mentor 100 needs to conduct with the user to achieve the goals 109 of the task understanding 107. According to some embodiments, hierarchical action models are used to define tasking cues relative to the workflow ontologies that are defined.

The output from the reasoning module 110 is input to the augmented reality generator 112 and the speech generator 114. The AR generator 112 created display content that takes the world model and user perspective from the sensors 1031 to 103n into account, i.e., task ontologies, next steps, display instructions, apparatus overlays, and the like, are modeled over the three-dimensional model of a scene stored in database 108 according to the user's perspective, as described in Tur et al., U.S. patent application Ser. No. 13/378,512, filed Mar. 12, 2012, entitled, "Method and Apparatus for Tailoring the Output of Intelligent Automated Assistant for a User," and U.S. patent application Ser. No. 13/314,965 to Yadgar, mentioned elsewhere herein, each of which is incorporated herein by this reference in its entirety. The AR generator 112 updates the display the user sees in real-time as the user performs tasks, completes, tasks, goals, moves on to different tasks, and transitions from one environment to the next.

The speech generator 114 creates contextual dependent verbal cues in the form of responses to the user indicating the accuracy of the user's actions, next steps, related tips, and the like. The output from the AR generator 112 and the speech generator 114 are synchronized to ensure that a user's experience is fluent and fully realized as an interactive training, or mentoring, environment.

In addition, the performance module 120 actively analyzes the user's performance in following task ontologies, completing workflows, goals, and the like. The performance module 120 can then also output display updates and audio updates to the AR generator 112 and the speech generator 114. The performance module 120 also interprets user actions against the task the user is attempting to accomplish. This, in turn, feeds the reasoning module 110 on next actions or verbal cues to present to the user.

Figure 2:
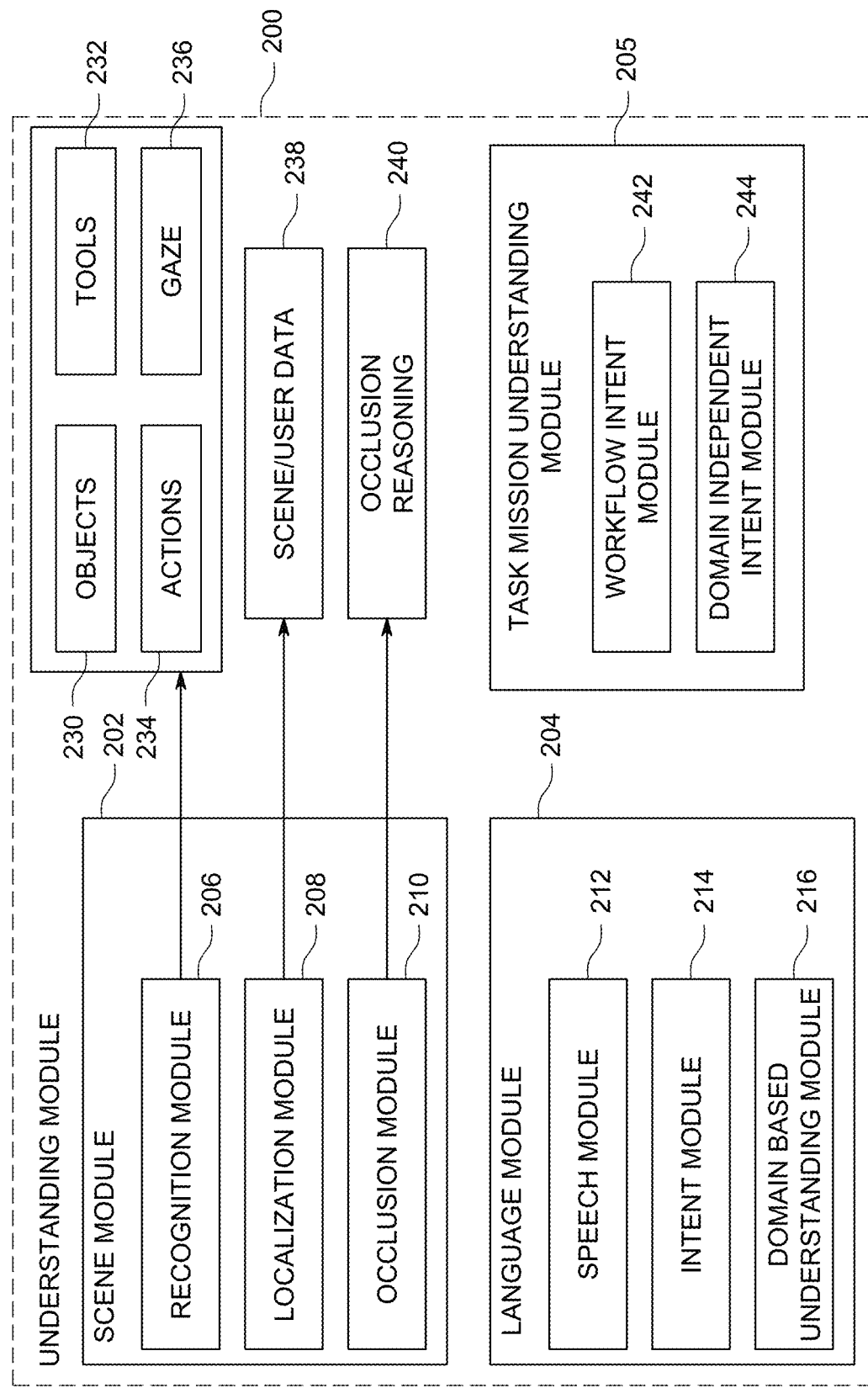
FIG. 2 depicts a simplified schematic diagram of at least one embodiment of the understanding module of FIG. 1.

FIG. 2 depicts a block diagram of the understanding block 200 in accordance with exemplary embodiments of the present invention. The understanding block 200 is comprised of the scene module 202, the language module 204 and the task mission understanding module 205.

The scene module 202 comprises a recognition module 206, a localization module 208 and an occlusion module 210. The recognition module 206 recognizes, for example objects 230, handheld (or otherwise) tools 232, users actions 234, user gaze 236, and the like.

The localization module 208 generates scene and user localization data 238 which precisely situates the user relative to the scene in FIG. 1 within six degrees of freedom. For mentoring applications, objects of interest (or the locale) are well defined. In such case the visual features of the object (or locale) can be extracted in advance for providing positioning with respect to the object in real-time. The localization module 208 performs Landmark matching/object recognition allowing for pre-building a landmark/object database of the objects/locales and using the database to define users' movements relative these objects/locales. Using a head-mounted sensory device such as a helmet, imagery and 3D data is collected to build 3D models and landmark databases of the objects of interest.

The video features provide high level of fidelity for precision localization that is not possible with a head-mounted IMU system alone. The localization method is based on an error-state Kalman filter algorithm using both relative (local) measurements obtained from image based motion estimation through visual odometry, and global measurements as a result of landmark/object matching through the pre-built visual landmark database. Exploiting the multiple-sensor data provides several layers of robustness to a mentoring system.

The occlusion module 210 generates occlusion reasoning 240, i.e., reasoning about objects being occluding and objects causing occlusion of other objects and determining depth based on the occlusions. In addition, the occlusion module 210 evaluates the three-dimensional perspective of the scene in FIG. 1 to evaluate distances and occlusion form the user's perspective to the scene objects 230.

According to some embodiments, the recognition module 206 uses the information generated by the localization module 208 to generate a model for user gaze 236 as well as the objects 230 and the tools 232 within the user's field of regard.

The language module 204 comprises a speech module 212, an intent module 214 and a domain based understanding module 216. The speech module 212 recognizes a user's natural language speech. The intent module 214 determines a user's intent based on statistical classifications. The understanding module 216 performs, according to one embodiment, domain specific rule based understanding. The speech module 212 converts speech to text and can be customized to a specific domain by developing the language and acoustic models, such as those described in Adam Cheyer, et al., *Cooperative Multimodal Communication Lecture Notes in Computer Science*, Volume 2155, 2001, pp 234-242, "A Unified Framework for Constructing Multimodal Experiments and Applications," which is incorporated herein by this reference in its entirety. Automatic Speech Recognition (ASR) is based on developing models for a large-vocabulary continuous-speech recognition (LVCSR) system that integrates a hierarchy of information at linguistic, phonetic, and acoustic levels. ASR supports natural, spontaneous speech interactions driven by the user needs and intents. This capability contrasts with most interactive voice response (IVR) systems where the system directs the dialogue, and the user is constrained to a maze of questions and limited answers. In addition, ASR can also support speaker-independent spontaneous speech when the topic of the conversation is bounded to a specific domain.

The intent module 214 uses statistics of large amounts of vocabulary and data and a sophisticated statistical model to characterize and distinguish the acoustic realization of the sounds of a language, and to accurately discriminate among a very large set of words (this statistical model is known as the "acoustic model"). ASR also uses a second statistical model to characterize the probabilities of how words can be combined with each other. This second model is referred to as the "language model". More technically, the language model specifies the prior probability of word sequences based on the use of N-gram probabilities. The training data should be as representative as possible of the actual data that would be seen in the real system operation. This in-domain data is used in addition to publicly available, out-of-domain data that can complement the training of the needed statistical models.

The domain based understanding module (DBUM) 216 component is responsible for transforming the user's utterance in natural language, using speech input in this proposal, into a machine-readable semantic representation of the user's goal. Natural Language Understanding (NLU) tasks can be divided into sub-components: 1) Event/intent classification: Determine the user goal in a given utterance and 2) Argument extraction: Determine the set of arguments associated with the user goal. Human language expresses meaning through various surface forms (e.g., prosody, lexical choice, and syntax), and the same meaning can be expressed in many different surface forms.

These aspects are further accentuated in conversational systems, in which the dialogue context plays a significant role in an utterance's meaning. Another aspect that is particularly important for spoken language understanding (SLU) is robustness to noise in the input. Unlike that of text understanding, the input to SLU is noisy because it is the output of a speech recognizer. In addition to this noise, spoken language is rampant with disfluencies, such as filled pauses, false starts, repairs, and edits. Hence, in order to be robust, the SLU architecture needs to cope with the noisy input from the beginning and not as an afterthought. Also, the meaning representation supports robust inference even in the presence of noise.

The DBUM 216 employs the high-precision rule-based system to get intent and arguments of the user's request and use the statistical system of the intent module 214 as needed (e.g., when user utterance cannot be parsed by the rule-based system or the intent is found ambiguous by the rule-based parser). As the coverage and accuracy of the statistical system increases with more in-domain data, we will switch to a more complicated combination approach where the rule-based system and the statistical system will be weighed based on the parser confidences, using different weighting schemes.

The task mission understanding module (TMUM) 205 further comprises a workflow intent module 242 and a domain independent intent module 244. The task mission understanding module 205 interprets semantic frames which encodes the language and scene based representations against a workflow and its current state to determine user intent.

Figure 3:
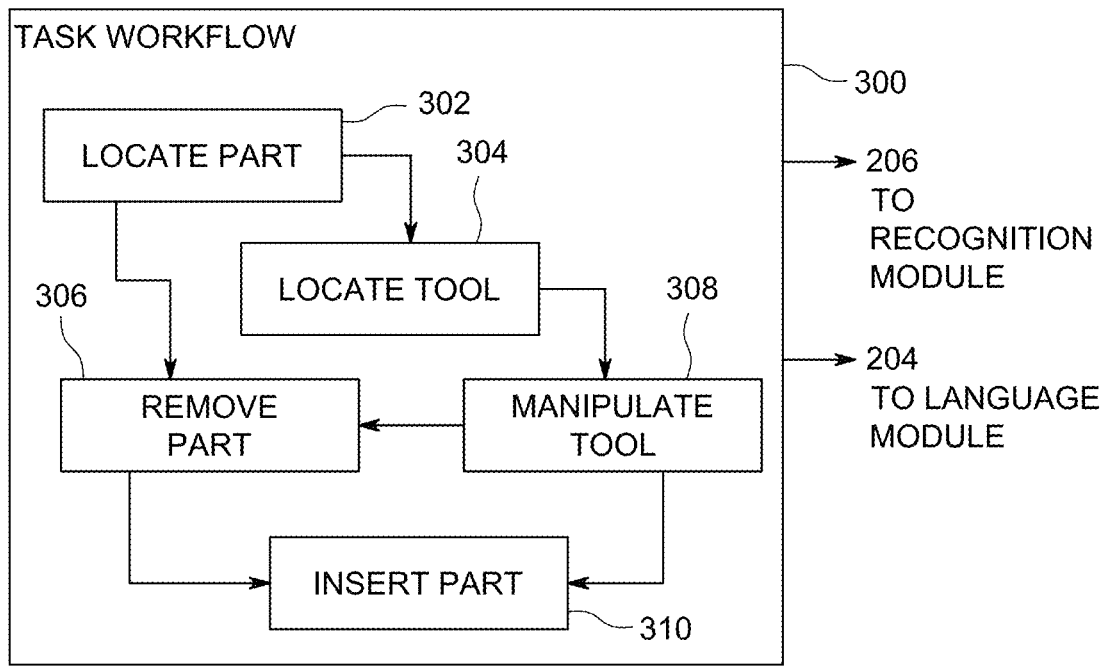
FIG. 3 depicts an example task workflow as disclosed herein.

The joint intent is formulated and relevant attributes that are associated with that intent are extracted and sent to the reasoning system. An example workflow is shown in FIG. 3 where an initial task is to "locate part" 302, i.e. locate a machine part. The next step in the workflow can either be "locate tool 304" or "remove part 306". The workflow also contains the steps of "manipulate tool" 308 and "insert part 310" according to exemplary embodiments of the present invention. Workflow 300 is merely a sample workflow and many other workflows are storable in the present invention.

The TMUM 205 is responsible for recognizing/interpreting user goals in a given state or context. The scene module 202 and language module 204 described above provide partial information about what the user is trying to do at a given time but in some cases the individual components may not have access to all the information needed to determine user goals. The TMUM 205 merges pieces of information coming from different components, such as scene understanding and language understanding in this case, as well as information that is coming from previous interactions, i.e., context/state information.

For example, the user might look at a particular object and say "where do I put this?" The scene module 202 identifies the location of objects in the scene and direction that the user is looking at (e.g., a screwdriver), and the language module 204 identifies that the user is asking a question to locate the new position of an object but neither component has a complete understanding of user's real goal. By merging information generated by individual modules, the system will determine that the user is "asking a question to locate the new position of a specific screwdriver".

Furthermore, in some cases, it is not enough to understand only what the user said in the last utterance but also important to interpret that utterance in a given context of recent speech and scene feeds. In the running example, depending on the task the user is trying to complete, the question in the utterance might be referring to a "location for storing the screwdriver" or a "location for inserting the screwdriver into another object."

The task/missing understanding component in this application merges three different semantic frames representing three different sources of information at any given time: 1. Semantic frame representing the scene (from the scene module 202), 2. Semantic frame extracted from the last user utterance (from the language module 204), 3. Semantic frame that represents the overall user goal up to that point (from prior interactions). The TMU 205 can also utilize useful information about the user's history and characteristics to augment the context information, which could enable adapting and customizing the user interaction.

Merging of these three pieces of information is accomplished using a hybrid approach that consists of: 1. A domain-independent unification mechanism that relies on an ontology structure that represents the events/intents in the domain and 2. Task-specific workflows using a workflow execution engine.

Figure 4:
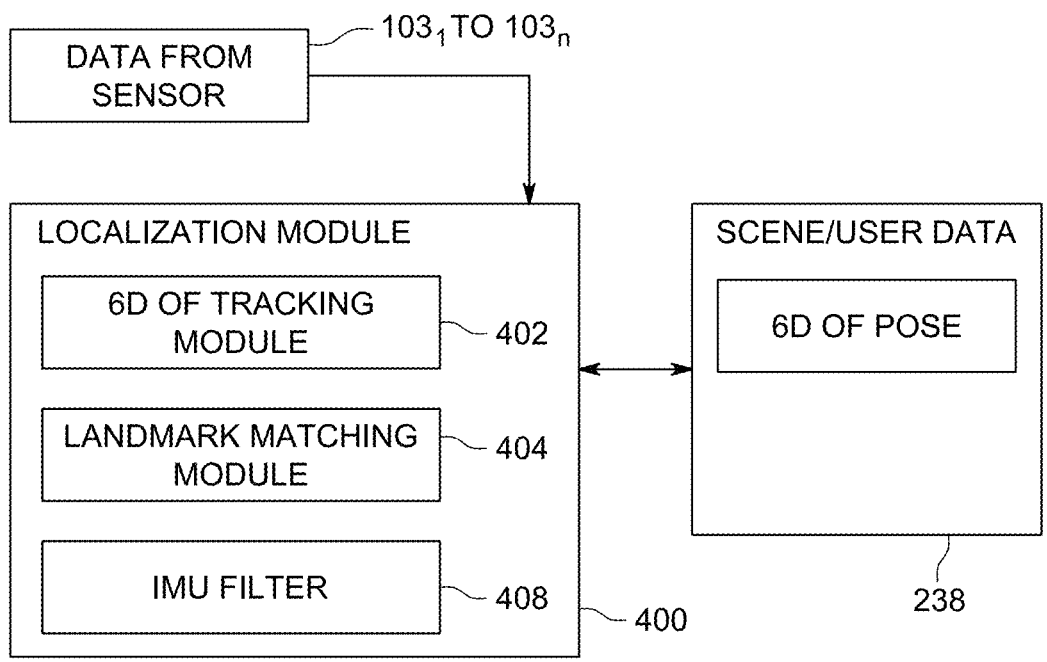
FIG. 4 is a simplified schematic diagram of at least one embodiment of the localization module of FIG. 2.

FIG. 4 is a block diagram of the localization module 400 in accordance with embodiments of the present invention. According to some embodiments, sensor data from sensors 1031 to 103n includes video data, GPS data, and inertial measurement unit (IMU) data, amongst others. The localization module 400 takes the data as input and outputs scene and user data 238, which is comprised a 6 degree of freedom (6DOF) pose. The localization module 400 comprises a 6DOF tracking module 402, a landmark matching module 404 and an IMU filter 408. Localization module 400 is fully described in U.S. Pat. No. 7,925,049 for "Stereo-Based Visual Odometry Method and System," filed on Aug. 3, 2007; U.S. Pat. No. 8,174,568 for "Unified Framework for Precise Vision-Aided Navigation," filed on Dec. 3, 2007, and U.S. Patent Application Publication Number 2010/0103196 for "System and Method for Generating A Mixed Reality Environment," filed on Oct. 27, 2007, each of which is hereby incorporated by reference in its entirety.

Figure 5:
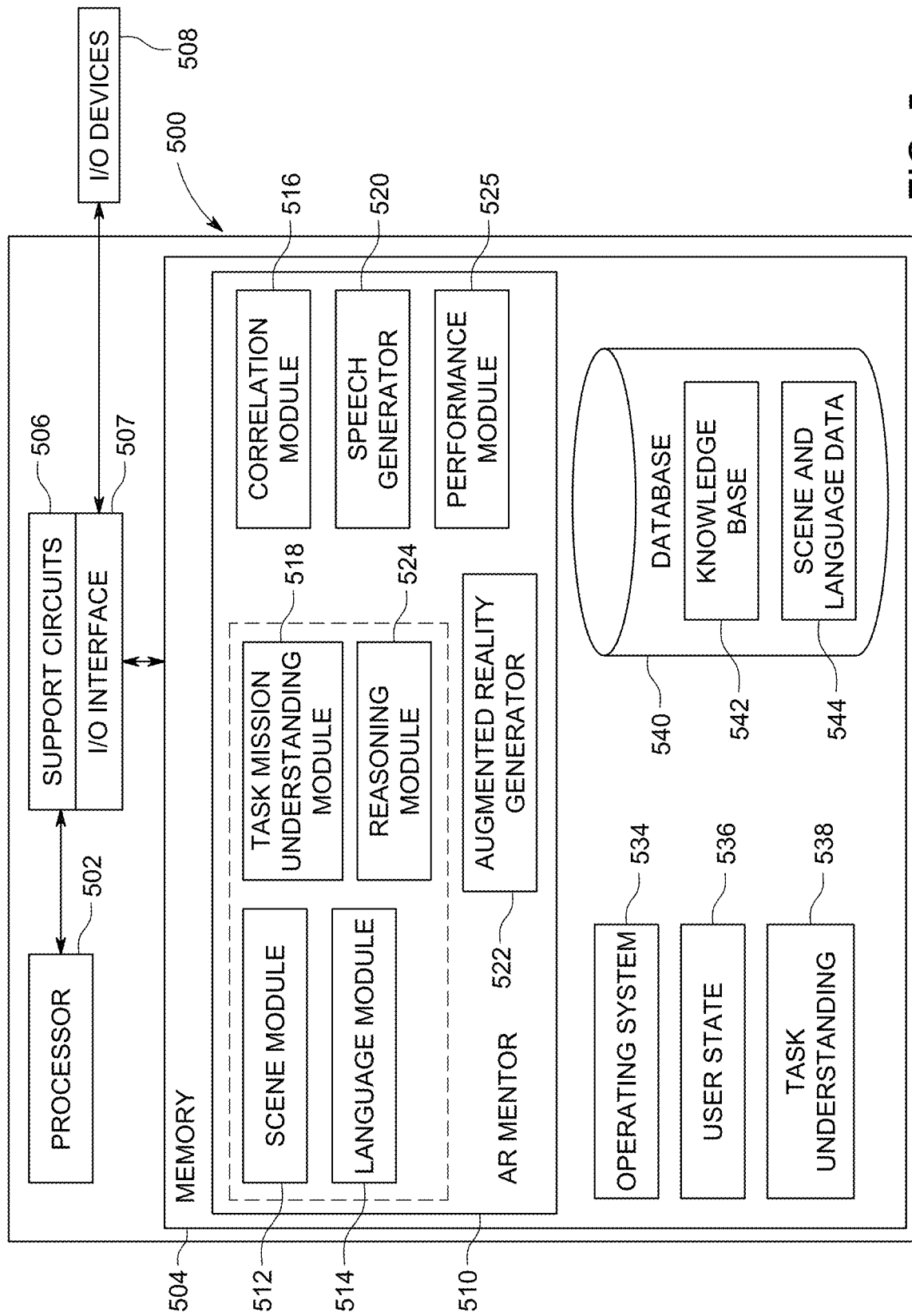
FIG. 5 depicts an example implementation of at least one embodiment of the computing system of FIG. 1.

FIG. 5 depicts an implementation of the AR mentor 100 of FIG. 1 by the computer 500 in accordance with at least one embodiment of the present invention. In some embodiments, AR mentor 100 may be implemented using a plurality of such computers, for example a group of servers. The computer 500 includes a processor 502, various support circuits 506, and memory 504. The processor 502 may include one or more microprocessors known in the art. The support circuits 506 for the processor 502 include conventional cache, power supplies, clock circuits, data registers, I/O interface 507, and the like. The I/O interface 507 may be directly coupled to the memory 504 or coupled through the supporting circuits 506. The I/O interface 507 may also be configured for communication with input devices and/or output devices such as network devices, various storage devices, mouse, keyboard, display, video and audio sensors, IMU and the like.

The memory 504, or computer readable medium, stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise an AR mentor 510.

As described below, in an exemplary embodiment, the AR mentor module 510 comprises a scene module 512, a language module 514, a correlation module 516, a task mission understanding module 518, a speech generator 520, an augmented reality generator 522, a reasoning module 524 and a performance module 525. The memory 504 also stores user state 536, task understanding 538 and a database 540, comprising a knowledge base 542 and scene and language data 544.

The computer 500 may be programmed with one or more operating systems (generally referred to as operating system (OS) 534), which may include OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, IOS, ANDROID among other known platforms. At least a portion of the operating system 534 may be disposed in the memory 504.

The memory 504 may include one or more of the following random access memory, read only memory, magneto-resistive read/write memory, optical read/write memory, cache memory, magnetic read/write memory, and the like, as well as signal-bearing media as described below.

Figure 6:
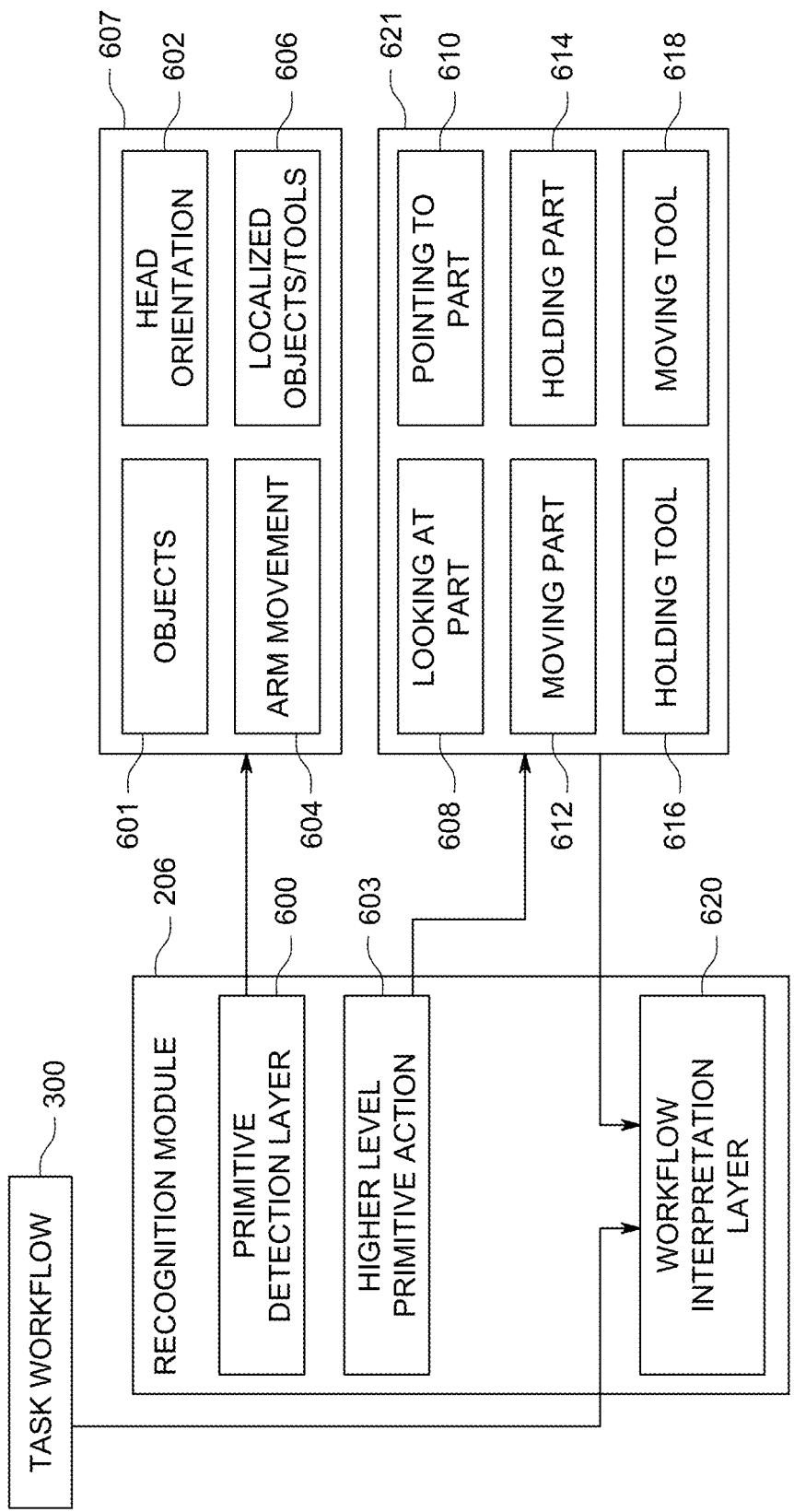
FIG. 6 depicts a simplified schematic diagram of at least one embodiment of the recognition module of FIG. 2.

FIG. 6 depicts a detailed view of the recognition module 206 in accordance with exemplary embodiments of the present invention. The recognition module comprises two layers of object recognition: the primitives detection layer 600 and the higher level primitive action layer 603.

According to some embodiments, the primitives detection layer 600, scene localization 606 is first used to first establish objects 601 and head orientation 602 in the world (or local scene 153 as shown in FIG. 1). Additionally depth and optical flow based reasoning is used to locate dynamic components; for example, general movement of the arms within field of regard 604. In the higher level primitive action layer, the primitives 607 are combined to identify higher level action primitives 621 that are observed. According to some embodiments of the present invention, support vector machines are used to classify such actions using the primitive detections from the first layer.

For example, actions such as "looking at part 608", "pointing to part 610", "holding tool 616", "moving part 612", "holding part 614", and "moving tool 618" are classified using the primitives detected by the primitive detection layer 600. The third layer, the workflow interpretation layer 620, interprets the action primitives 621 against a context specific workflow model (e.g., task workflow 300 as shown in FIG. 3) and the current context within this model to identify new workflow states and transitions.

According to some embodiments, Hidden Markov Models (HMM) are used to model the transitions of the finite-state machine that represents the task workflow 300. Associated output information (called scene-based semantic frames) from the workflow interpretation layer 620 is passed to the task mission understanding module 106 for fusion with language based cues. By limiting the object recognition to the world model of interest (of equipment being handled, for example) and knowing orientation and location of the world model relative to the user allows parts of interest to be tracked through the operations of the AR mentor 100. Similarly by evaluating actions in the context of the task workflow 300 using the workflow interpretation layer 620, allows us to develop more reliable detections.

Figure 7:
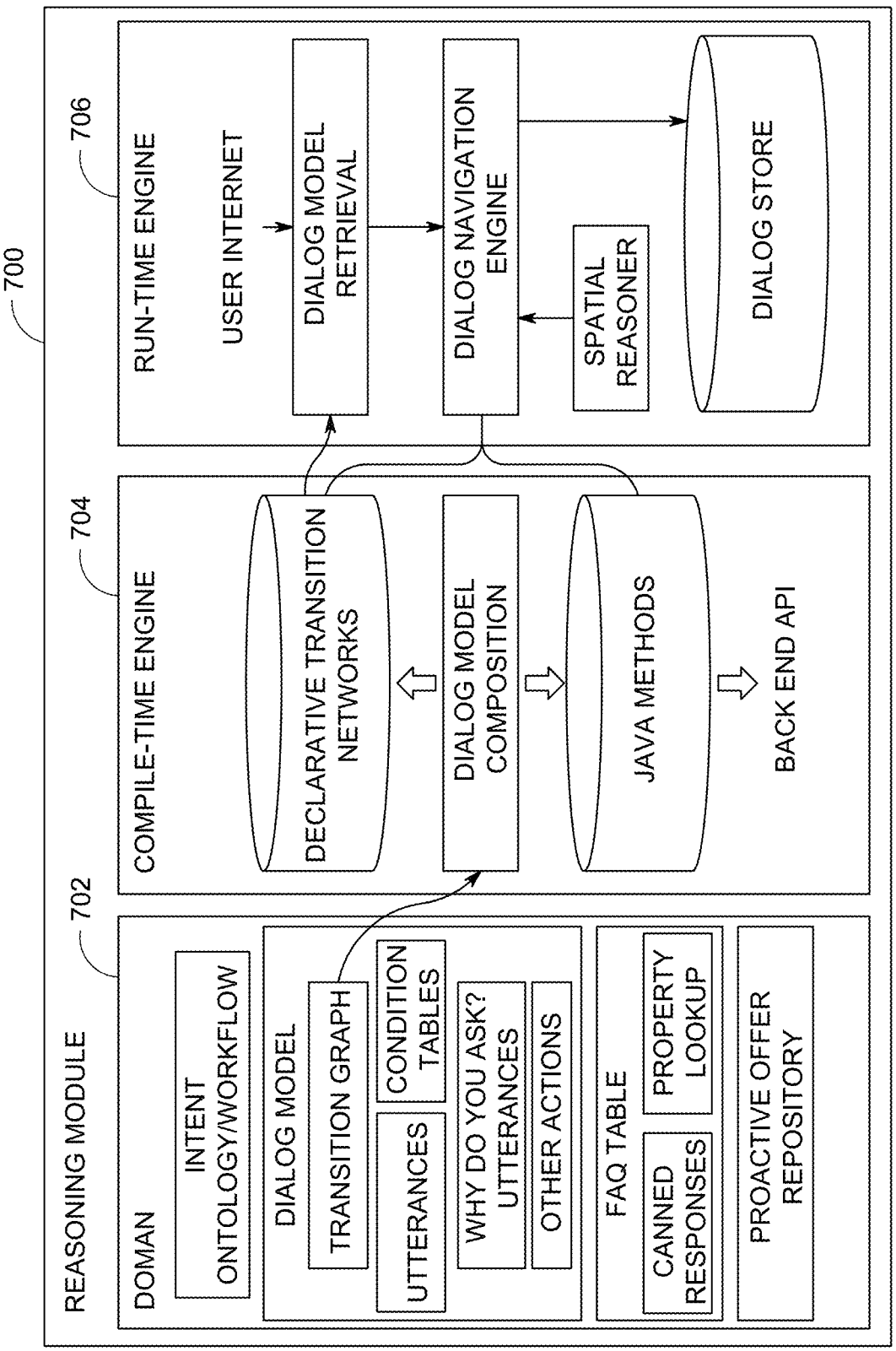
FIG. 7 is a simplified schematic diagram of at least one embodiment of the reasoning module of FIG. 1 shown as reasoning module 700.

FIG. 7 is a detailed depiction of the reasoning module 110 in FIG. 1 shown as reasoning module 700 in accordance with exemplary embodiments of the present invention. The reasoning module 700 receives the detailed representation of the user's current state and goals as inputs, as determined by the TMUM 106 and produces a representation of an appropriate response, where the response may be audio dialog, UI displays, or some combination of the two according to one embodiment.

The reasoning module 700 uses detailed domain knowledge to ensure that the AR mentor 100 responds correctly and takes appropriate action from a domain perspective, and that these responses and actions instill trust in the user of the AR mentor 100. Reasoning calculates the next response or action of the AR mentor 100 using a variety of diverse sources: detailed knowledge of the domain's procedures and preferred styles of interaction; known information about the user, including their level of expertise in the domain; and the status of the context of the dialog with the user this far.

The detailed architecture of the existing reasoning module 700 is shown in FIG. 7. The architecture facilitates the acquisition of multifaceted domain knowledge 702 designed to drive user-system dialogs and interactions covering a wide variety of topics within the domain. This knowledge is then compiled by an engine 704 into machine-interpretable workflows along with (if necessary) a set of methods that interact with domain back-end systems—retrieving information from legacy databases, etc. Then at run time, the run-time engine 706 uses those compiled workflows to interpret user intents received from the understanding module 123 and determines the next step for the AR mentor 100 to take.

This step is represented as an AR mentor "Intent", and may encode dialog for the speech generator 114 to generate, actions or changes within the UI, both of those, or even neither of those (i.e., take no action). The reasoning module 700 acquires, designs and en-codes the domain knowledge for user interaction in the task's chosen domain. This includes identifying and designing all possible user Intents and AR-Mentor Intents for the portion of the domain covered, designing dialogs that anticipate a wide variety of possible conditions and user responses, and developing APIs for any domain back end systems used in our system.

The reasoning module 700 tracks certain events being observed in a heads-up display, determines the best modality to communicate a concept to the user of the heads-up display, dynamically composes multimodal (UI and language) "utterances", manages the amount of dialog vs. the amount of display changes in the interaction, and the like. According to one embodiment, AR mentor "Intents" also accommodate robust representation of a variety of events recognized by the recognition module 206 shown in FIG. 2, and incorporates a spatial reasoning plug-in specifically to develop dialog based on user perspective and object placements in the world. According to another embodiment, the reasoning module 700 estimates the information value to the user of various types and modalities of output to determine coherent and synchronous audio-visual feedback.

The reasoning module 700 will further initiate dialogs based on exogenous events ("exogenous" in the sense that they occur outside the user-mentor dialog), which may include the AR mentor 100's current assessment of an ongoing operation/maintenance process it is monitoring by extending a "proactive offer" functionality, and enhance the representation of the input it uses to make next-step decisions. The reasoning module is further described in Yadgar, U.S. patent application Ser. No. 13/314,965 filed on Dec. 8, 2011, entitled "Generic Virtual Personal Assistant Platform," which is incorporated herein by this reference in its entirety.

Figure 8:
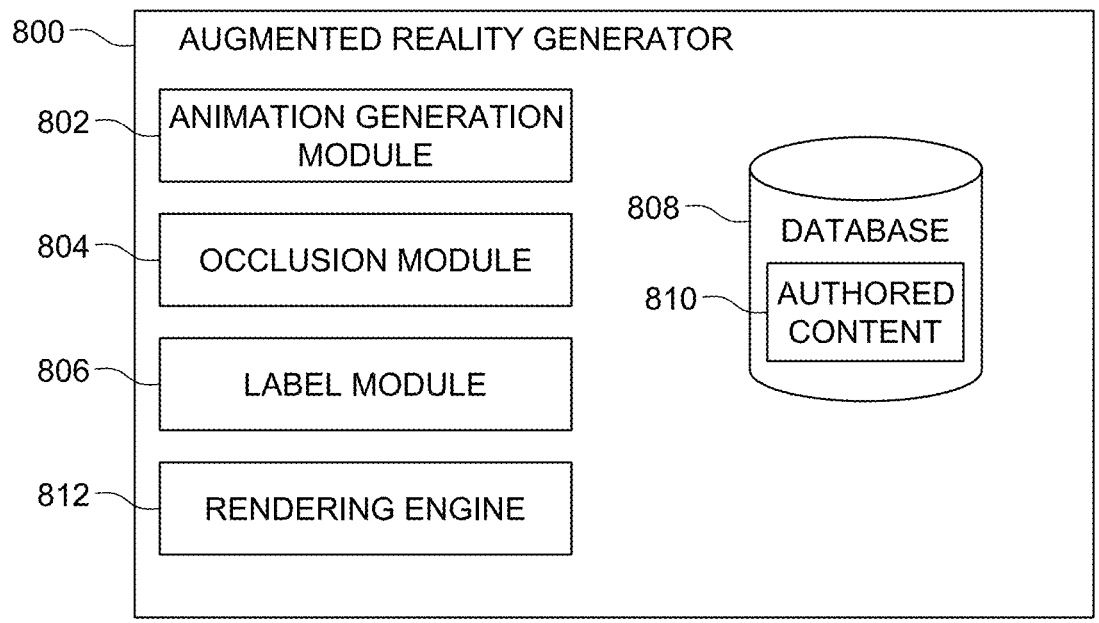
FIG. 8 is a simplified schematic diagram of at least one embodiment of the AR generator of FIG. 1.

FIG. 8 is a detailed depiction of the AR generator 112 of FIG. as AR generator 800. The AR generator 800 uses computed head poses to accurately render animations and instructions on a user display, for example, AR goggles, so that the rendered objects and effects appear as if they are part of the scene. The AR generator 800 provides low-lag realistic overlays that match precisely with a real-world scene.

The AR generator 800 relies on the localization module 208 of the scene module 202 as shown in FIG. 2 to obtain an accurate head pose. The generated pose accounts for delays in the video processing and rendering latencies to make the overlays correctly appear in the world scene. The animation generation module 802 asks the localization module 208 to predict a pose just-in-time for rendering to a display. On such request the localization modules 208 uses a Kalman Filter to exploit the high-rate IMU input to accurately predict the location and orientation of a user's head in approximately 5-10 msec, in one embodiment.

The occlusion module 804 works with dynamic depth maps in its rendering pipeline. The dynamic depth that is obtained from the scene module 202 in FIG. 2 is fused with information from computer aided drawing models (for the scene or objects) that are available to create consistent occlusion masks for rendering to the display. This ensures correct 3D layering between the rendered objects against the real-world scene. The AR generator 800 further comprises a label module 806 for labeling objects in the scene and organizing these labels on the rendered view.

The animation generator 800 relies upon a well-organized pre-authored domain specific content stored in database 808 to enable intuitive instructions. The authored content 810 is organized hierarchically and incorporated within the logic of the reasoning module 110 to ensure intuitive triggering of these scripts. Based on these higher level instructions, a rendering engine 812 will sequence through lower-level set of animations and visualizations with intuitive transitions.

Figure 9:
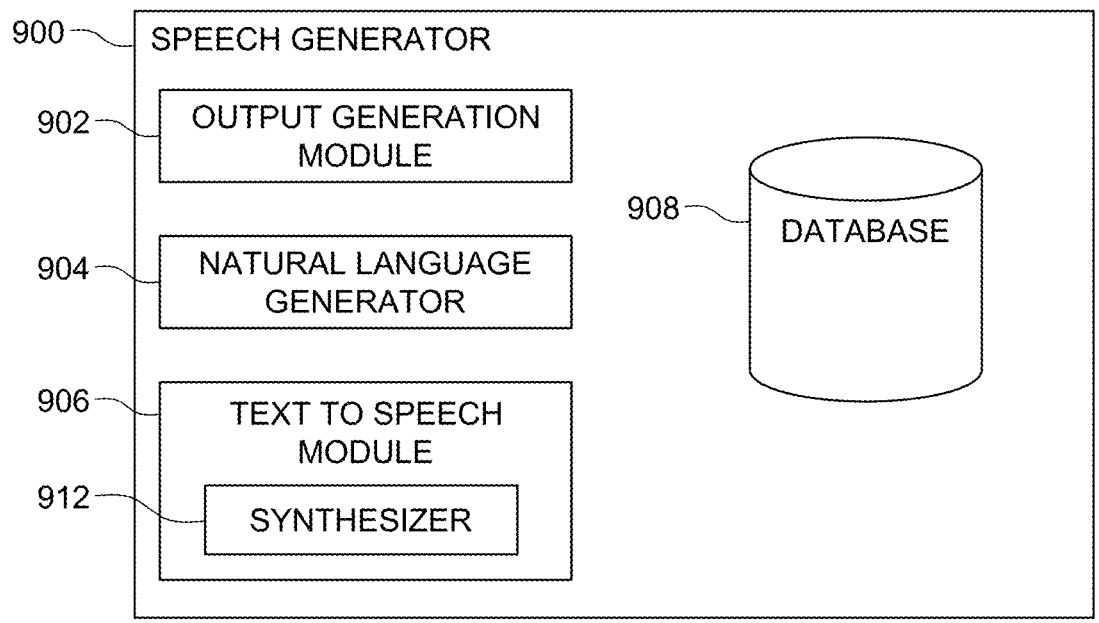
FIG. 9 depicts a simplified schematic diagram of at least one embodiment of the speech generator of FIG. 1.

FIG. 9 depicts a detailed view of the speech generator 114 as speech generator 900 in accordance with embodiments of the present invention. The speech generator 900 comprises an output generator 902, a natural language generator (NLG) 904 and a text to speech module 906.

The output generation module 902 receives input from the reasoning module 700 shown in FIG. 7 such as actions and converts them into different forms of action representations such as text, speech, domain specific actions, and UI manipulations, as appropriate for the user and the environment.

The NLG 904 employs hierarchical output templates with fixed and optionally variable portions that are generated on the fly using linguistic tools to generate system responses in a given interaction with the user. Each action generated by the reasoning module 700 has an associated prompt template, and the system chooses the most appropriate response by synthesizing the variable portion of the response.

The responses from the NLG 904 are customized according to the user as well as the state of the simulated interaction, i.e., the training, repair operation, maintenance, etc. The speech generator 900 optionally can take advantage of external speech cues, language cues and other cues coming from the scene to customize the responses. In various cases, NLG module 904 leverages visual systems such as AR and a user interface on a display to provide the most natural response. As an example, the NLG 904 may output "Here is the specific component" and use the AR generator 800 to show the component location with an overlaid arrow rather than verbally describing the location of that component.

The text to speech module 906 converts output text to speech, so that an answer from the reasoning module 700 can be played back as audio to the user. The text to speech module 906 uses selection concatenative synthesis. This approach uses a large database 908 of prerecorded and segmented speech from one speaker. The database 908 is created by segmenting each utterance into multiple units of different length, such as phones, diphones, syllables, morphemes, words and phrases.

To generate an arbitrary output, the synthesizer 912 determines the best chain of candidate units from the database 908 in a process known as unit selection. The chosen segments are smoothly concatenated and played back. Unit selection synthesis offers high level natural speech, mostly when the text to synthesize can be covered by sets of longer units. According to one embodiment, the text to speech module 806 is implemented using the TTS product from NEOSPEECH.

Figure 10:
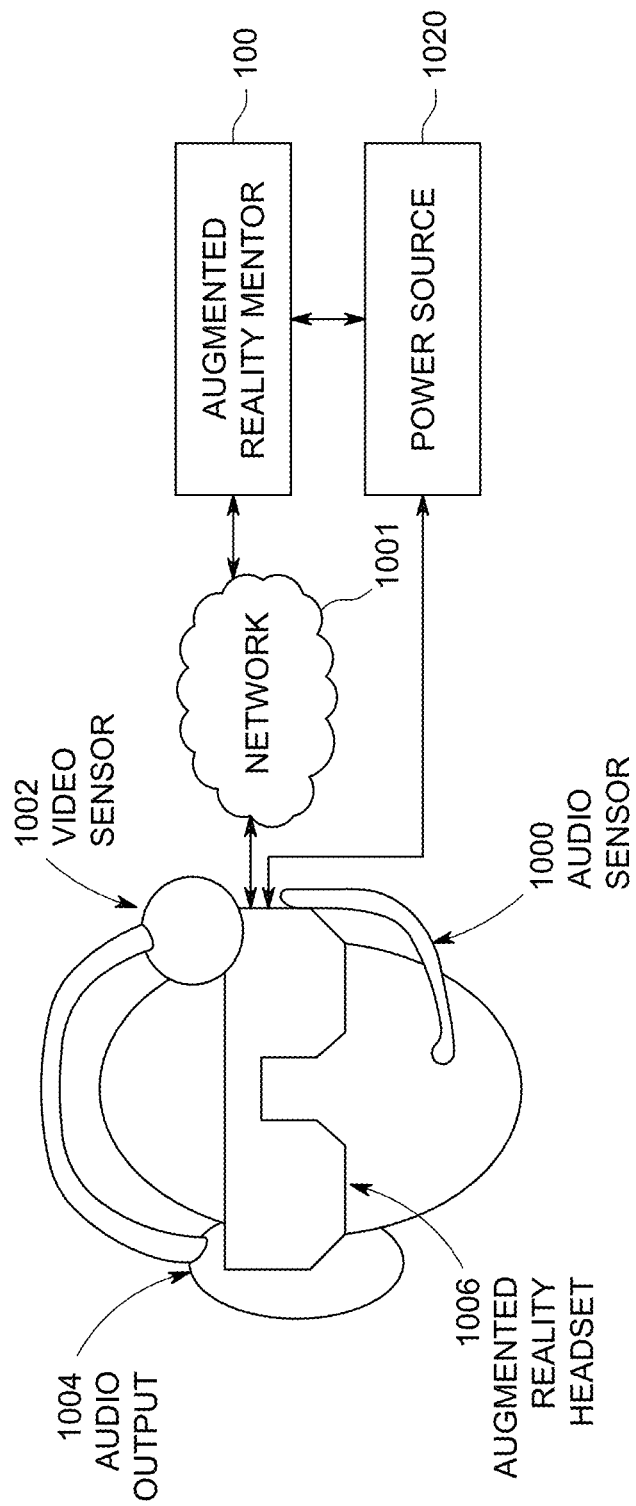
FIG. 10 illustrates a simplified schematic diagram of at least one embodiment of an augmented reality mentor computing system as disclosed herein.

FIG. 10 illustrates an AR mentor of FIG. 1 in accordance with at least one exemplary embodiment of the present invention. The AR mentor 100 is coupled to an AR headset 1006 over a network 1001. In other embodiments, the AR mentor 100 is directly communicatively coupled to the AR headset 1006. The AR headset 1006 is coupled to a video sensor 1002, an audio sensor 1000 and an audio output 1004.

The video sensor 1002 and the audio sensor 1000 serve as a portion of the sensors 1031 to 103n. The AR headset 1006 also comprises an IMU unit which is not shown. The AR headset 1006 is used by the AR mentor 100 to both sense the environment using audio, visual and inertial measurements and to output guidance to the user through natural language spoken dialogue through the audio output 1004, headphones, and visual cues augmented on the user's head mounted display, the headset 1006. The wearable system provides for a heads-up, hands-free unencumbered interface so that the user is able to observe and manipulate the objects in front of him freely and naturally.

According to some embodiments, clip on sensor packages are utilized to reduce weight. In some embodiments, the video sensor is an ultra-compact USB2.0 camera from XIMEA (MU9PC_HM) with high resolution and sensitivity for AR, with a 5.7×4.28 mm footprint. Alternatively, a stereo sensor and light-weight clip-on bar structure may be used for the camera. The IMU sensor may be an ultra-compact MEMs IMU (accelerometer, gyro) developed by INERTIAL LABS that also incorporates a 3 axis magnetometer. In an alternate embodiment, the XSENS MTI-G SENSOR, which incorporates a GPS, is used as the IMU sensor.

The headset 1006 may be a see-through display such as the INTEVAC I-PORT 75, or the IMMERSION INTERNATIONAL head mounted display with embedded speakers (HMD). According to some embodiments, the processor for running the AR mentor 100 is a compact sealed processor package incorporating a PC-104 form factor INTEL i-7 based computer, or a 4 core I-7 enclosed within a ruggedized sealed package. Alternatively, the AR mentor 100 can be deployed on a smart tablet or smart phone, and can communicate with the headset 1006 through the network 1001 or a direct coupling. Further, smart devices often come with audio, video, IMU, and GPS sensors built in. In other embodiments, the generated AR can be shown through a wall mounted or table mounted display along with speaker systems, where cameras and microphones are set up in a room to provide an AR mentoring experience. The power source 1020 may be a battery pack designed to fit a military style vest with MOLE straps according to one embodiment.

Figure 11:
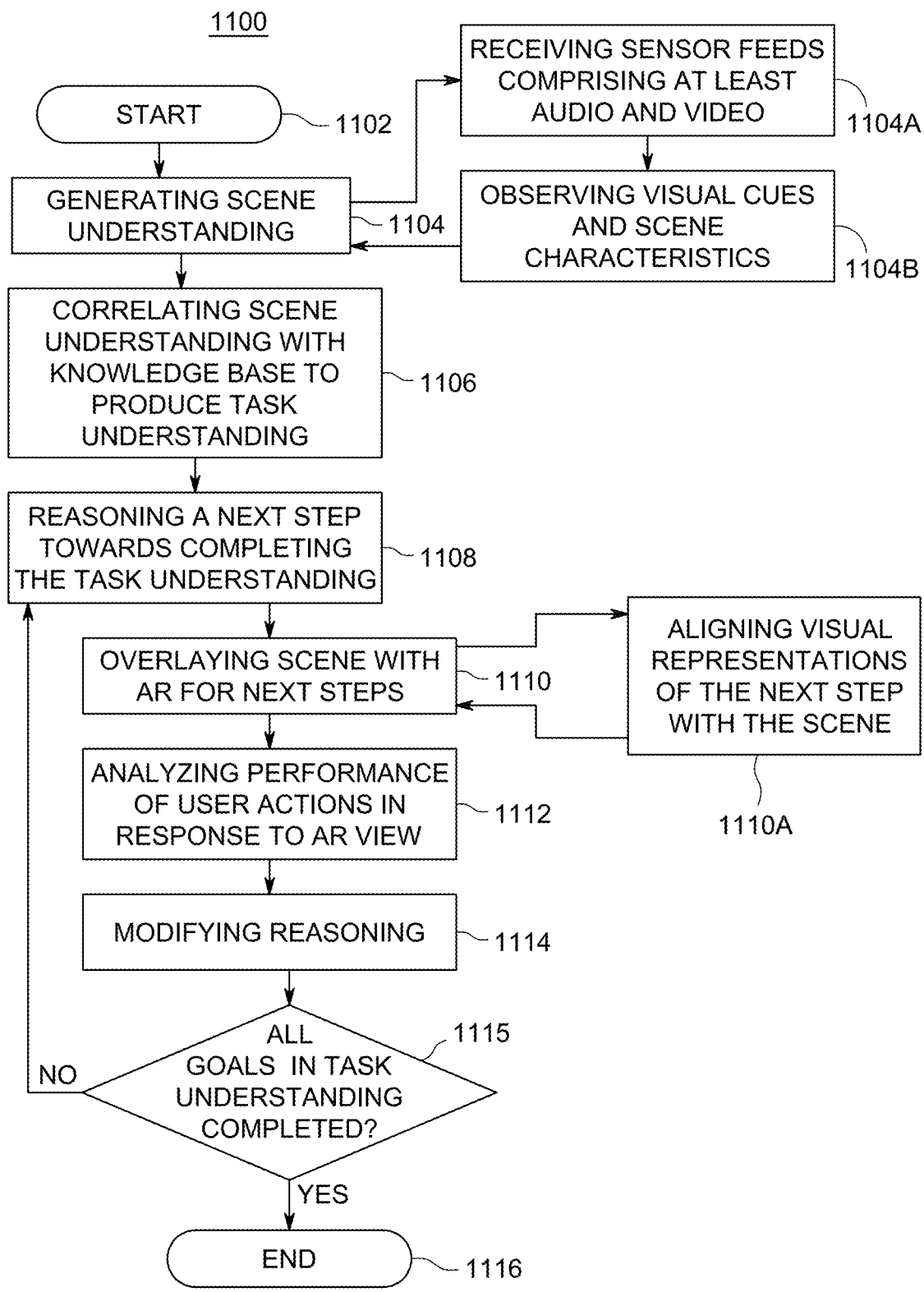
FIG. 11 depicts a simplified flow diagram of at least one embodiment of a method for training users in accordance with embodiments of the present invention.

FIG. 11 depicts a flow diagram of a method 1100 for training users in accordance with embodiments of the present invention. The method 1100 is an implementation of the AR mentor 510 as executed by the processor 502 by the computer system 500 as shown in FIG. 5.

The method begins at step 1102 and proceeds to step 1104. At step 1104, a scene understanding is generated by the understanding module 571 based on video and audio input of a scene of a user performing a task in a scene, recorded or captured by a video sensing device such as video sensor 1002 and audio sensor 1000 as shown in FIG. 10.

At sub-step 1104A, the AR mentor 510 receives sensor feeds of at least audio and video, and may optionally receive GPS data, IMU data, and other localization or pose data to improve AR functionality. The scene module 512 recognizes objects and movement in the scene and the language module 514 recognizes natural language being spoken in the audio as well as a set of preconfigured commands. The method then proceeds to step 1104B, where the scene module 512 observes visual cues such as particular hand movements, gestures, movement of a device, and the like, and scene characteristics, such as time of day, location, and the like.

The method then proceeds to step 1106, where the correlation module 516 correlates the scene understanding with a knowledge base which is stored either on a database or some form of storage, to produce a task understanding. The knowledge base may include repair and maintenance instructions for a multitude of vehicles, machines, or the like, or in some embodiments the knowledge base may contain training information for training users in weapons handling, exercise routines, or the like.

At step 1108, the reasoning module 524 reasons a next step towards completing one or more goals in the produced task understanding. The task understanding may be of a compound task which has multiple goals and sub-goals. According to some embodiments, the reasoning module 524 determines which goal or sub-goal has priority in completion and reasons a next step based on the priority.

The method proceeds to step 1110, where the AR generator 522 overlays the scene with AR visualizations or text for what the next steps are determined to be. At sub-step 1110A, visual representations of the next steps are aligned with the scene according to, for example, user pose from an IMU or the like.

The method then proceeds to step 1112, where once the user has performed the next step visualized by the AR generator 522, the performance module 525 analyzes the user's performance of the step and overall performance of the task represented by the task understanding. The performance module determines a level of the user's performance and modifies the reasoning a next step at step 1114.

The AR mentor 510 determines whether all goals in the task understanding are completed at step 1115, and if they are, the method terminates at step 1116. If the goals have not all been completed, the method proceeds to earlier step 1108 and continues onwards until all goals are completed, or the user terminates the activity.

Figure 12:
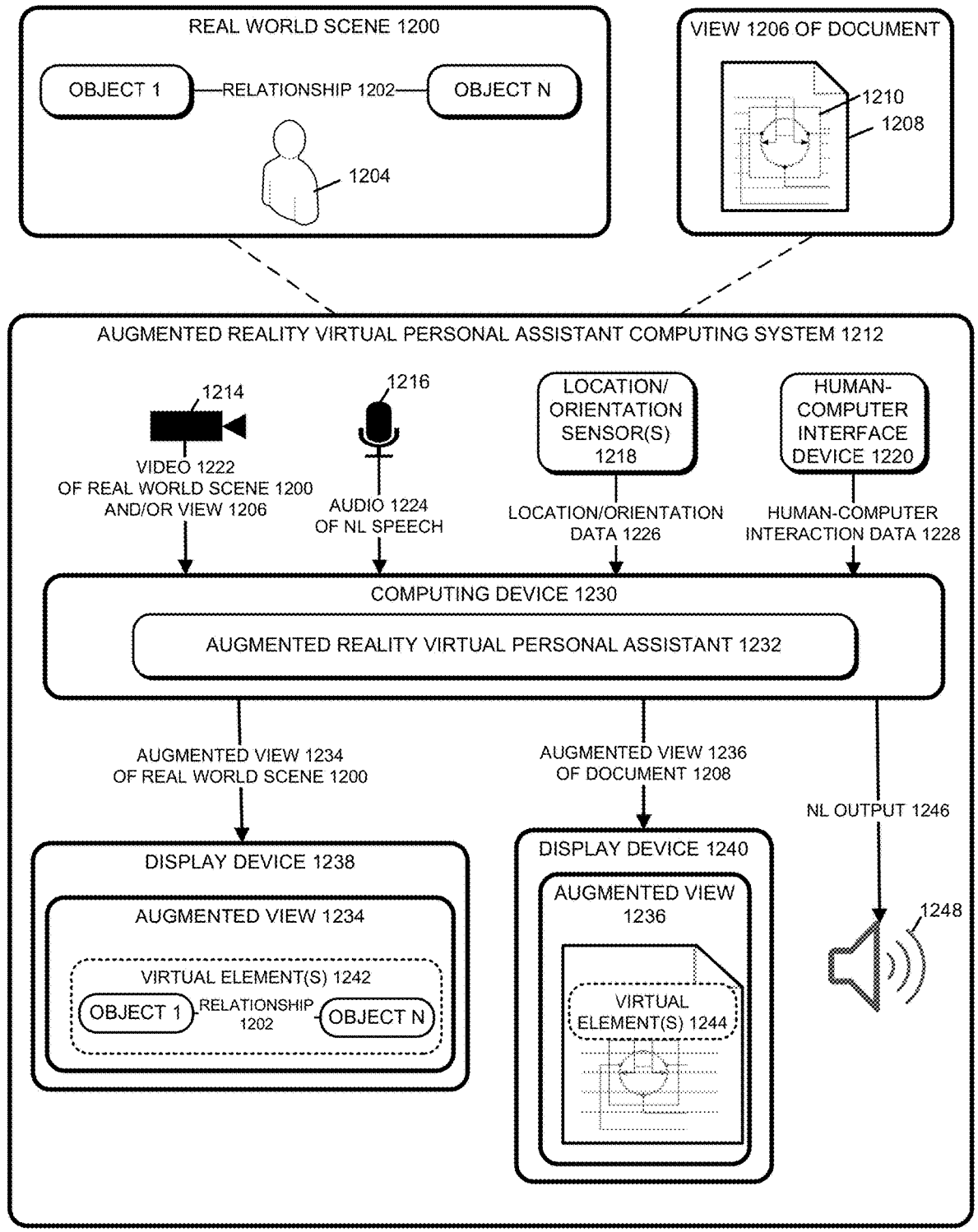
FIG. 12 is a simplified schematic diagram of an environment of at least one embodiment of an augmented reality-capable virtual personal assistant computing system as disclosed herein.

Referring now to FIG. 12, an embodiment of an augmented reality-capable virtual personal assistant ("AR VPA") computing system 1212 is shown in the context of an environment that may be created during the operation of the system 1212 (e.g., an execution or "runtime" environment provided by hardware, firmware, and/or software). The illustrative AR VPA system 1212 executes artificial intelligence technologies including computer vision and natural language processing algorithms to, among other things, make "seamless" connections between real-world objects and external representations of the real world objects. To do this, the AR VPA system 1212 displays virtual elements on real-world views of objects, and/or the AR VPA system 1212 displays virtual elements on the external representations of the objects, using one or more display devices 1238, 1240 of the computing system 1212. The AR VPA system 1212 may coordinate the display of the virtual elements with a natural language dialog session, to, for example, provide assistance to a person performing a multi-step activity, such as a training session, a troubleshooting effort, or another procedural type of task during which a reference document may be helpful. In this way, the system 1212 can, for example, aid individuals in identifying and focusing on relevant parts of reference documents (e.g., complicated or difficult-to-follow diagrams and/or other documents) at the appropriate moment during the performance of a multi-step activity, link the relevant parts of the diagrams with corresponding objects in the real world view, and correlate parts of the real world view that are currently of interest with relevant parts of the documents. Some examples of multi-step activities in which embodiments of the system 1212 may be used include teaching, training, diagnostic, repair, maintenance, assembly, construction, and development activities, medical and dental procedures, sports coaching, game-time sports strategizing, and/or other activities that involve a number of steps. Embodiments of the AR VPA system 1212 are designed to be used in the context of a multi-step activity that involves the observation and/or handling of real world physical objects, including objects that have a number of component parts, as well as other real world situations.

As used herein, an "external representation" may refer to, among other things, a document that depicts, describes, or discusses one or more objects, e.g., in a different context than the real-world scene. For example, an external representation may include a schematic diagram, an electronic circuit diagram, a mechanical drawing, an architectural drawing, a piping diagram, a flow diagram, a layout diagram, a map, an anatomical diagram, a sports playbook or diagram (e.g., "X's and O's"), an artist's rendering, a two-dimensional (2D) or three-dimensional (3D) model, a 2D or 3D graphic, a 2D or 3D image, a text description, an animation, a video clip, graphics (e.g., videos, 2D diagrams, 3D animations, pointers, etc.), text labels, and dialogs (e.g., recitation of technical manual steps, elaborated explanations and rationales, embedded queries/assessments) and/or other types of documents. As used herein, a "document" may refer to any type of stored content, including, among other things, a physical document (e.g., a paper or a page of a book) or an electronic document (e.g., a drawing file, a Portable Document Format (PDF) file, an image file, a video file, or a word processing document).

The illustrative augmented reality-capable virtual personal assistant computing system 1212 includes a number of devices 1214, 1216, 1218, 1220 that receive or generate multi-modal inputs, such as video 1222, audio 1224, location/orientation data 1226, and human computer interaction data (e.g., gestures, "taps," mouse clicks, keypad input, etc.) 1228, which are elicited from a real world scene 1200 and/or a real world view 1206 of a document 1208. The real world scene 1200 may include the performance of a multi-step activity involving a person 1204 and one or more physical objects 1 to N (where N is a positive integer), and where multiple objects 1, N may have relationships 1202 with one another. Such relationships may include, for example, component-subcomponent relationships, inter-component relationships, part-whole relationships, spatial relationships, fluid couplings, mechanical couplings, electrical couplings, physiological connections, and/or others. As used herein, "object" may refer to, among other things, people, physical objects, object assemblies, networks of objects, or combinations of people and objects, including constituent parts, such as sub-components, sub-assemblies, and human body parts (e.g., faces, hands, etc.). Where this description refers to a person, human, people, or similar terminology, it should be appreciated that aspects of the description may also be applicable to non-human physical objects, and vice versa.

The illustrative document 1208 includes one or more external representations 1210 of one or more of the physical objects 1, N that are present in the real world scene 1200. For example, the document 1208 may include a number of different schematic diagrams each showing the schematic for a portion or component of a larger object or system. A camera 1214 acquires images (e.g., video 1222) of the real world scene 1200 and/or the view 1206 of the document 1208. As used herein, a "camera" may refer to any device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "stand-off" cameras that are installed in walls or ceilings), and/or mobile cameras (such as cameras that are integrated with consumer electronic devices, such as desktop computers, laptop computers, smart phones, tablet computers, wearable electronic devices and/or others.

In some cases, the real world view 1206 of the document 1208 may be part of the real world scene 1200. For example, if the document 1208 is resting on a table next to the person 1204 or near a physical object 1, N, an image acquired by the camera 1214 may include the document 1208 and other aspects of the real world scene 1200. In other cases, the view 1206 of the document 1208 may not be a part of the real world scene 1200. For instance, if the camera 1214 is embodied in a wearable computing device, such as augmented reality glasses or a GOOGLE GLASS-type device, while the document 1208 is displayed on a mobile computing device such as a tablet computer, the camera 1214 may capture images of the real world scene 1200, while the document 1208 is displayed on a display screen of the computing device that is outside the field of view of the camera 1214. The video 1222 may be stored in computer memory as a video file and analyzed by the system 1212 as disclosed herein.

A microphone 1216 acquires audio inputs 1224, such as natural language speech of the person 1204. The audio 1224 may be stored in computer memory as an audio file and analyzed by the system 1212 as disclosed herein. One or more location/orientation sensors 1218 acquire location/orientation data 1226 in order to spatially align or "register" the video 1222 with the real world scene 1200 so that object detection and/or object recognition algorithms and other computer vision techniques can determine an understanding of the real world scene 1200. The sensor(s) 1218 may include an inertial measurement unit (IMU), an accelerometer, a gyroscope, a compass, a global positioning system (GPS) transceiver, and/or other devices for obtaining information about the position of the camera 1214 (or motion of the camera 1214) with respect to the real world scene 1200. For example, if the camera 1214 is supported by the person 1204 (e.g., as a component of a wearable or body-mounted device), the location/orientation data 1226 provides information (e.g., head tracking navigation) to allow the system 121 to detect and respond to the person's movements, which can change the field of view of the camera 1214. As used herein, "field of view" (FOV) may refer to, among other things, the extent of the observable real world that is visible through the lens of the camera 1214 at any given moment in time. The field of view may depend on, for example, the particular position and spatial orientation of the camera 1214, the focal length of the camera lens (which may be variable, in some embodiments), the size of the optical sensor, and/or other factors, at any given time instance. Objects that are outside a camera's FOV at the time that the video 1222 is recorded will not be depicted in the video 1222.

One or more human-computer interface devices 1220 acquire human-computer interaction data 1228. The human-computer interface device(s) 1220 may include, for example, a touch-screen display, a touch-sensitive keypad, a kinetic sensor and/or other gesture-detecting device, an eye-tracking sensor, and/or other devices that are capable of detecting human interactions with a computing device.

The devices 1214, 1216, 1218, 1220 are illustrated in FIG. 1 as being in communication with a computing device 1230. It should be understood that any or all of the devices 1214, 1216, 1218, 1220 may be integrated with the computing device 1230 or embodied as a separate component. For example, the camera 1214, microphone 1216, and/or sensor(s) 1218 may be embodied in a wearable device, such as a head-mounted display, GOOGLE GLASS-type device or BLUETOOTH earpiece. Alternatively, the devices 1214, 1216, 1218, 1220 may be embodied in a single computing device, such as a smartphone or tablet computing device.

As described in more detail below, the system 1212 includes an augmented reality-capable virtual personal assistant 1232, which is a computer application embodied in the computing device 1230. The augmented reality virtual personal assistant ("AR VPA") 1232 is embodied as a number of computerized modules and data structures, including hardware, firmware, software, or a combination thereof. The AR VPA 1232 analyzes the multi-modal inputs 1222, 1224, 1226, 1228 as they are detected over time, and in response to the multi-modal inputs 1222, 1224, 1226, 1228, determines and updates a semantic understanding of the real world scene 1200 at different time instants (e.g., as the performance of a multi-step activity unfolds). The AR VPA 1232 correlates time-dependent instances of the semantic understanding of the scene 1200 with a semantic understanding of the document 1208. The AR VPA 1232 coordinates the presentation of system-generated natural language speech output 1246 and virtual elements 1242, 1244 at different time instants (e.g., during the performance of a multi-step activity), in order to relate real world elements of the scene 1200 to corresponding content of the document 1208 and vice versa, in accordance with the current context of the real world scene 1200. For example, as an activity progresses, the AR VPA 1232 can map different portions of the document 1208 to different portions of the real world scene 1200 (and vice versa) by presenting different visual and speech cues.

As illustrated in the embodiment of FIG. 12, the visual cues include the one or more virtual elements 1242, 1244, and the audio cues include natural language output 1246. The one or more virtual elements 1242 are presented by the AR VPA 1232 as visual element(s) of an augmented view 1234 of the real world scene 1200 (e.g., as a virtual overlay on the real world view), while the one or more virtual elements 1244 are presented as visual element(s) of an augmented view 1236 of the document 1208 (e.g., as an annotation to the document 1208 or a virtual overlay). In the illustrated embodiment, the augmented views 1234, 1236 are presented on different display devices: the augmented view 1234 including the virtual element(s) 1242 is presented on a display device 1238 while the augmented view 1236 including the virtual element(s) 1244 is presented on a display device 1240. For example, the display device 1238 depicting the augmented view 1234 of the real world scene 1200 may be embodied as a head mounted display, augmented reality glasses, or as a display of a mobile computing device (e.g., a camera view on a smart phone or tablet computer), while the display device 1240 depicting the augmented view 1236 of the document 1208 may be embodied as a display screen of a mobile computing device, or another type of electronic device having a display screen, such as a television or a computer monitor. In other embodiments, the views 1234, 1236 may be displayed on the same display device (e.g., either the device 1238 or the device 1240) or the display devices 1238, 1240 may be components of a single device (e.g., an electronic device having multiple display screens). The AR VPA 1232 outputs the speech cues, e.g., natural language output 1246, using one or more speakers 1248. The speaker(s) 1248 may be an integrated component of the display device 1238 or the display device 1240, or may be embodied in a separate component (such as audio headphones or ear buds). Moreover, any or all of the components 1238, 1236, 1248 may be integrated with the computing device 1230, in some embodiments.

Figure 13:
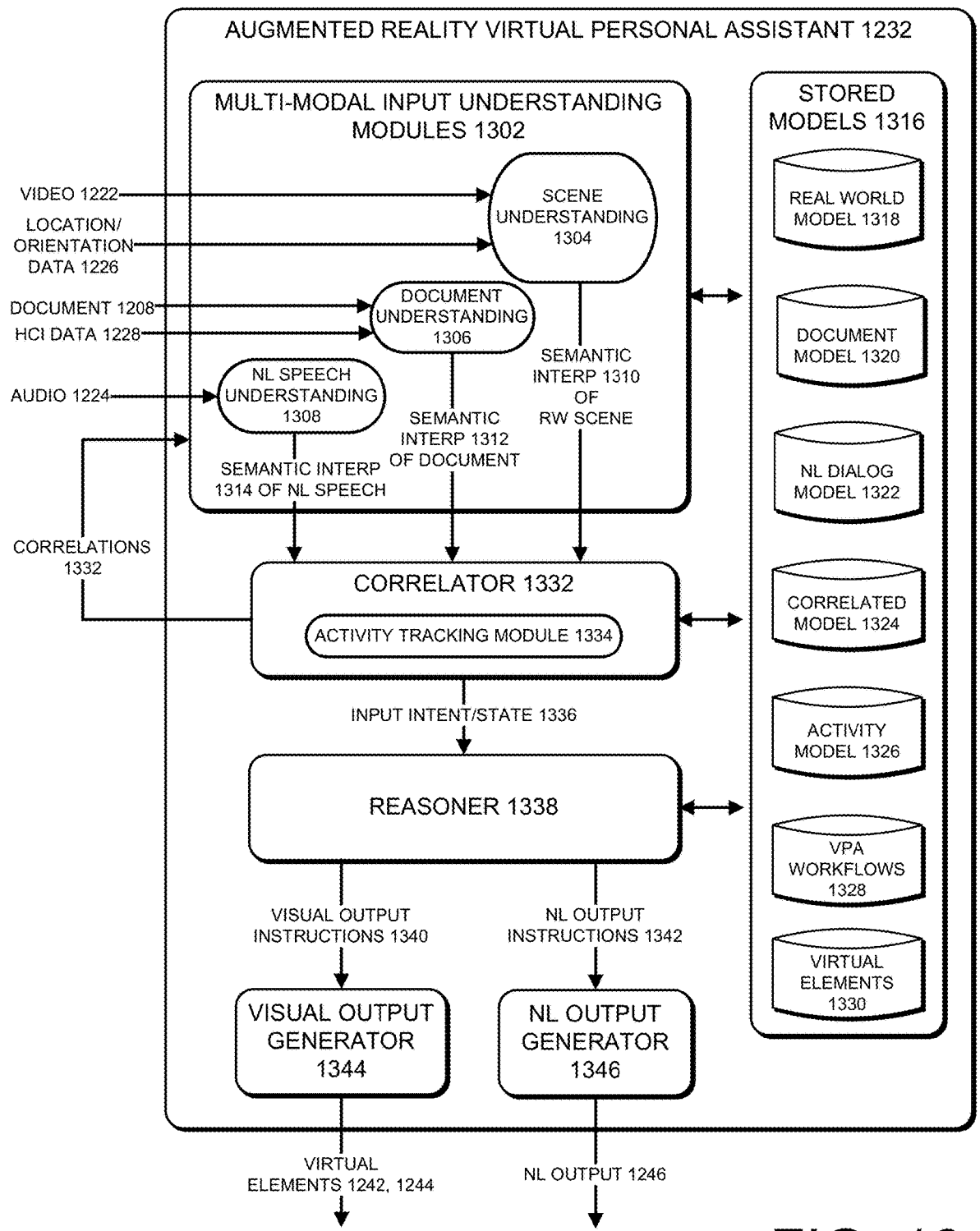
FIG. 13 is a simplified schematic diagram of an environment of at least one embodiment of the augmented reality virtual personal assistant of FIG. 12.

Referring now to FIG. 13, an embodiment of the AR VPA 1232 is shown in greater detail, in the context of an environment that may be created during the operation of the system 1212 (e.g., an execution or "runtime" environment). The illustrative AR VPA 1232 is embodied as a number of computerized modules, components, and/or data structures, including a number of multi-modal input understanding modules 1302, a number of stored models 1316, a correlator 1332, a reasoner 1338, a visual output generator 1344, and a natural language output generator 1346. The illustrative multi-modal input understanding modules 1302 include a scene understanding module 1304, a document understanding module 1306, and a natural language speech understanding module 1308. Each or any of the modules of the AR VPA 1232 may be embodied in computer hardware, firmware, software, or a combination thereof. The scene understanding module 1304 analyzes the video 1222, the location/orientation data 1226, and correlations 1332 fed back from the correlator 1332 as described below (if any), using a real world model 1318. The real world model 1318 allows the scene understanding module 1304 to, among other things, classify objects detected (e.g., by computer vision algorithms) in the video 1222 at different time instants. The real world model 1318 may include a mapping of visual features to semantic descriptions of objects in the real world scene 1200. For example, the real world model 1318 may include a mapping or mapping function that correlates visual features detected in the video 1222 with semantic descriptions of objects, people, actions and/or events.

The scene understanding module 1304 outputs a semantic interpretation 1310 of the real world scene 1200 at different time instants (e.g., for different frames of the video 1222). As such, the scene understanding module 1304 updates the semantic interpretation 1310 "in real time" as the real world scene 1200 changes (e.g., as different steps of a multi-step activity are initiated, performed, and completed). The semantic interpretation 1310 may include, for example, names of objects detected in the real world scene 1200 (e.g., "battery," "solenoid," etc.), relationships between different detected objects (e.g., "solenoid is connected to the battery"), locations of detected objects (e.g., "battery is on the front right side") or descriptions of actions and events (e.g., "cleaning the battery contacts") in the real world scene 1200. In some embodiments, the scene understanding module 1304 or the correlator 1332 may interface with an activity model 1326, described below, to recognize an object, action or event in the video 1222 as corresponding to a step of a multi-step activity. Aspects of the scene understanding module 1304 may be embodied as the understanding module 123 or the scene module 101, 202 described above, and aspects of the real world model 1318 may be embodied as, for example, the knowledge base 133 and/or the scene and language data 135 described above.

The document understanding module 1306 analyzes the document 1208 and correlations 1332 (if any) which are fed back from the correlator 1332 as described below, using a document model 1320. The document model 1320 allows the document understanding module 1306 to, among other things, identify and classify content of the document 1208 at different time instants. During this process, the document understanding module 1306 may extract portions of content of the document 1208 for use as virtual element(s) 1242, or determine or select other graphical elements stored in computer memory to be used as virtual element(s) 1242, and associate those selected elements with different portions of the document 1208. The document model 1320 may include a mapping of different portions of the document 1208 (e.g., external representations of different objects) to semantic descriptions of those different portions of the document 1208. As an example, the document model 1320 may include mappings of various pixel coordinates with associated object names (e.g., [pixel coordinates], "battery symbol") or connections between objects (e.g., [pixel coordinates], "battery-solenoid connection"). The document understanding module 1306 can output a semantic interpretation 1312 of relevant portions of the document 1208 and/or data relating to corresponding virtual element(s) 1242, 1244 at different time instants. For example, if the human-computer interface (HCI) data 1228 indicates that the user of the AR VPA 1232 has tapped the display device 1240 at a particular location, the document understanding module 1306 may determine the document content selected by the user with the tap, and output a semantic interpretation 1312 of only that particular content (e.g., "car battery"). As such, the document understanding module 130 can update the semantic interpretation 1312 "in real time" as the relevant portions of the document 1208 change (e.g., due to different steps of a multi-step activity being initiated, performed, and completed). The semantic interpretation 1312 may include, for example, semantic descriptions of different portions of the document content (e.g., "battery," "piping") and coordinates locating those portions of the content in the document 1208 and/or data identifying corresponding virtual element(s) 1242, 1244.

The illustrative natural language (NL) speech understanding module 1308 analyzes the audio 1224 and correlations 1332 (if any) fed back from the correlator 1332 as described below, using a natural language dialog model 1322. The NL dialog model 1322 allows the NL speech understanding module 1308 to, among other things, interpret human speech (e.g., dialog spoken by the person 1204) received at different time instants. For example, the NL dialog model 1322 may include a mapping of speech signals to spoken words or phrases and a mapping of words or phrases to semantic descriptions of the likely intended meaning of those words or phrases (for example, "cap" could be intended as a noun or as a verb, depending on the surrounding verbal context). The NL speech understanding module 1308 outputs a semantic interpretation 1314 of the audio 1224 at different time instants. As such, the NL speech understanding module 1308 can incorporate semantic interpretations of previous rounds of dialog into its analysis of a current instance of NL dialog, and thus follow the dialog "in real time" as the real world scene 1200 changes (e.g., as different steps of a multi-step activity are initiated, performed, and completed). The semantic interpretation 1314 may include, for example, text corresponding to the spoken words or phrases and/or semantic descriptions corresponding to the text (e.g., "unscrew the cap," manipulate_object(cap, unscrew)). Aspects of the NL speech understanding module 1308 may be embodied as, for example, the understanding module 123 or the language module 104, 204 described above, and aspects of the NL dialog model 1322 may be embodied as, for example, portions of the knowledge base 133 and/or the scene and language data 135 described above. Alternatively or in addition, aspects of the NL speech understanding subsystem including the understanding module 1308 and the dialog model 1322 may be embodied using any suitable spoken dialog understanding technology, including various features of virtual personal assistant platforms developed by SRI International, which are described in a number of other patent applications of SRI International. Such patent applications include, for example, Tur et al., PCT International Application Publication No. WO 2011/028833, entitled "Method and Apparatus for Tailoring Output of an Intelligent Automated Assistant to a User;" Yadgar et al., U.S. patent application Ser. No. 13/314,965, filed Dec. 18, 2011, entitled "Generic Virtual Personal Assistant;" Ayan et al., U.S. patent application Ser. No. 13/866,509 filed Apr. 19, 2013, entitled "Clarifying Natural Language Input Using Targeted Clarification Questions;" Kalns et al., U.S. patent application Ser. No. 13/954,613, filed Jul. 30, 2013, entitled "Using Intents to Analyze and Personalize a User's Dialog Experience with a Virtual Personal Assistant;" and Nitz et al., U.S. patent application Ser. No. 13/966,665, filed Aug. 14, 2013, entitled "Providing Virtual Personal Assistance with Multiple VPA Applications," all of which are incorporated herein by reference to provide background information relating to exemplary spoken natural language dialog applications. However, such references are provided for illustration only, and aspects of this disclosure are by no means limited to use in connection with technology developed by SRI International. Rather, the features disclosed herein are applicable to a wide variety of different technologies that enable user-directed spoken natural language dialog as an input modality, including components of voice-enabled mobile systems.

Taken together, the various semantic interpretations 1310, 1312, 1314 indicate a current context of the operation of the AR VPA 1232 at a given time instant. The illustrative correlator 1332 analyzes and "merges" the various semantic interpretations 1310, 1312, 1314 associated with given time instants, and interfaces with a correlated model 1324 to develop correlations 1332 and, based on the correlations 1332, an "input intent" or "state" 1336. The correlations 1332 and input intent/state 1336 are updated "in real time" as the current context of the system 1212 changes (e.g., as new inputs 1208, 1222, 1224, 1226, 1228 are received). To merge the semantic interpretations 1310, 1312, 1314, the correlator 1332 may use the correlated model 1324 to align data elements of the individual semantic interpretations 1310, 1312, 1314, or pairs or combinations of the semantic interpretations 1310, 1312, 1314, with corresponding "slots" of an "intent" data structure. For example, each of the semantic interpretations 1310, 1312, 1314 may be implemented as an "intent" data structure (e.g., an XML data structure). Each semantic interpretation 1310, 1312, 1314 may include data values that indicate an action and one or more parameters of the action (e.g., "show_element (battery)"). The mapping 1414 of the correlated model 1324 may define the relationships between the different elements of the semantic interpretations 1310, 1312, 1314, so that the elements can be combined to formulate the correlations 1332, and so that the correlations 1332 can be used to formulate the input intent/state 1334.

In some embodiments, each correlation 1332 indicates a relationship between two semantic interpretations 1310, 1312, 1314 in a pair of semantic interpretations 1310, 1312, 1314. For example, a correlation 1332 may indicate that an element of the scene 1200 corresponds to a particular portion of an external representation 1210, or that a particular instance of NL speech 1224 relates to a particular object in the scene 1200 or a particular portion of an external representation 1210. Each correlation 1332 may be implemented as an "intent" data structure in a similar manner as described above, and then the correlations 1332 can be combined to formulate the input intent/state 1336.

As an example, suppose that the scene understanding module 1304 determines based on analysis of the video 1222 that the car battery is an object that is currently of interest to the person 1204, the document understanding module 1306 determines that the person 1204 has tapped on a region of the display device that corresponds to the car battery, and the NL speech understanding module 1308 determines that the person 1204 has said, "show it to me." In this case, the semantic interpretation 1310 of the real world scene 1200 may include an intent such as "select_rw_object(battery)." The semantic interpretation 1312 of the document may include an intent such as "select_doc_object(power source)" and the semantic interpretation 1314 may include an intent such as "show(car_battery)." The correlator 1332 may apply the mapping 1414 to develop a correlation 1332 that links the select_rw_object(battery) intent with the select_doc_object(power source) intent, and another correlation 1332 that links the show(car_battery) intent with the select_rw_object (battery) intent. The correlator 1332 may then "merge" these correlations 1332 and/or the individual semantic interpretations 1310, 1312, 1314 to develop a "global" input intent/state 1336 of "explain_battery (rw_overlay=doc_power_source, rw_location=battery, speech=battery_location_explanation)." Some examples of techniques for creating and merging intents are described in the aforementioned VPA applications of SRI International, for example in Ayan et al., U.S. patent application Ser. No. 13/866,509 filed Apr. 19, 2013, entitled "Clarifying Natural Language Input Using Targeted Clarification Questions;" and Kalns et al., U.S. patent application Ser. No. 13/954,613, filed Jul. 30, 2013, entitled "Using Intents to Analyze and Personalize a User's Dialog Experience with a Virtual Personal Assistant."

The correlator 1332 feeds the correlations 1332 back to the input understanding modules 1302 to be used in generating the semantic interpretations 1310, 1312, 1314 of the inputs 1208, 1222, 1224, 1226, 1228. For example, the document understanding module 1306 may utilize a correlation 1332 to determine that an instance of HCI data 1228 relates to a particular object in the real world scene 1200. Similarly, the NL speech understanding module 1308 may utilize a correlation 1332 to determine that an instance of NL speech audio 1224 should be interpreted as referring to a particular section of the document 1208.

The input intent/state 1336 is embodied as a semantic representation of the current state of the real world scene 1200 given all of the interpreted inputs 1310, 1312, 1314. The input intent/state 1336 provides a semantic description of the system 1212's understanding of what the person 1204 is doing or trying to do at a particular moment during a multi-step activity, or provides a semantic description of a current condition or state of an object in the real world scene. As an example, the correlator 1332 may resolve the inputs 1310, 1312, 1314 to determine that the person 1204 is asking the system 1212 to show a detailed portion of the document 1406 that corresponds to an object at which the person 1204 is pointing in the real world scene 1200. As another example, the correlator 1332 may deduce from the inputs 1310, 1312, 1314 that the user is beginning a new step of an activity and proactively present a virtual element 1242 or a virtual element 1244 that relates to the new step of the activity. To do this, an activity tracking module 1334 of the correlator 1332 interfaces with an activity model 1326 to determine and keep track of the current step of the multi-step activity in which the person 1204 is involved. The activity tracking module 1334 may also keep track of steps of the multi-step activity that the person 1204 has completed. For instance, the activity tracking module 1334 may update a counter or status flag in response to user input (e.g., by the multi-modal input understanding modules 1302 interpreting a gesture or speech as "checking off" certain tasks). The activity model 1326 allows the activity tracking module 1334 to, among other things, identify and classify different combinations of the inputs 1310, 1312, 1314 as corresponding to different steps of an activity at different time instants. For instance, the activity model 1326 may include a mapping of input combinations to semantic descriptions of corresponding activities or steps (e.g., "[user pointing at], [pixel coordinates], speech("show me"), display_RW_overlay(battery)" or "[scene: "car with hood open"], [step 1], display_doc_overlay(battery)." Aspects of the correlator 1332 may be embodied as, for example, the understanding module 123, the correlation module 102 and/or the task understanding module 106 described above, and aspects of the activity model 1318 may be embodied as, for example, the database 108 described above.

The illustrative reasoner 1338 analyzes the input intent/state 1336, executes VPA workflows 1328 to determine the next action to be performed by the system 1212, and executes the action by accessing the NL dialog model 1322 and/or the virtual elements 1330. In doing so, the reasoner 1338 may apply one or more computer-implemented artificial intelligence reasoning techniques to reason about the most likely appropriate next thing that the system 1212 should do next. Examples of functionality that may be incorporated into the reasoner 1338 are described in the aforementioned VPA patent applications of SRI International. Alternatively or in addition, aspects of the reasoner 1338 may be embodied as, for example, the reasoning module 110, 700 described above. The VPA workflows 1328 may be embodied as a set of rules, states, and/or conditions, which may be linked by a probabilistic model such as a Bayesian network. For example, the VPA workflows 1328 may indicate, for a given input intent/state 1334, a set of possible executable actions and associated probabilistic likelihoods that each action is an appropriate response to the input intent/state 1334. The executable actions specified by the VPA workflows 1328 include indications of virtual element(s) 1242, 1244 and/or NL output 1246 that are likely appropriate responses to various input intents/states 1334. For example, if the person 1204 is looking at an object 1 in the real world scene 1200, the reasoner 1338 may determine, based on reasoning executed using the VPA workflows 1328, to output a virtual overlay 1242 as part of an augmented view 1234 of the real world scene 1200; whereas, if the person 1204 has said "show me on the diagram," the reasoner 1338 may determine to output a virtual element 1244 as part of an augmented view 1236 of the document 1208. Where the reasoner 1338 determines that the system 1212 is to output one or more visual cues, the reasoner 1338 passes visual output instructions 1340 to a visual output generator 1344. If the reasoner 1338 determines that the system 1212 is to output a verbal cue (e.g. NL speech), the reasoner 1338 passes NL output instructions 1342 to an NL output generator 1346. It should be understood that the visual output instructions 1340 and the NL output instructions 1342 need not be mutually exclusive. For example, any combination of virtual element(s) 1242, 1244, and NL output 1246 may be output concurrently, sequentially, or asynchronously, by the visual and NL generators 1344, 1346.

Figure 17:
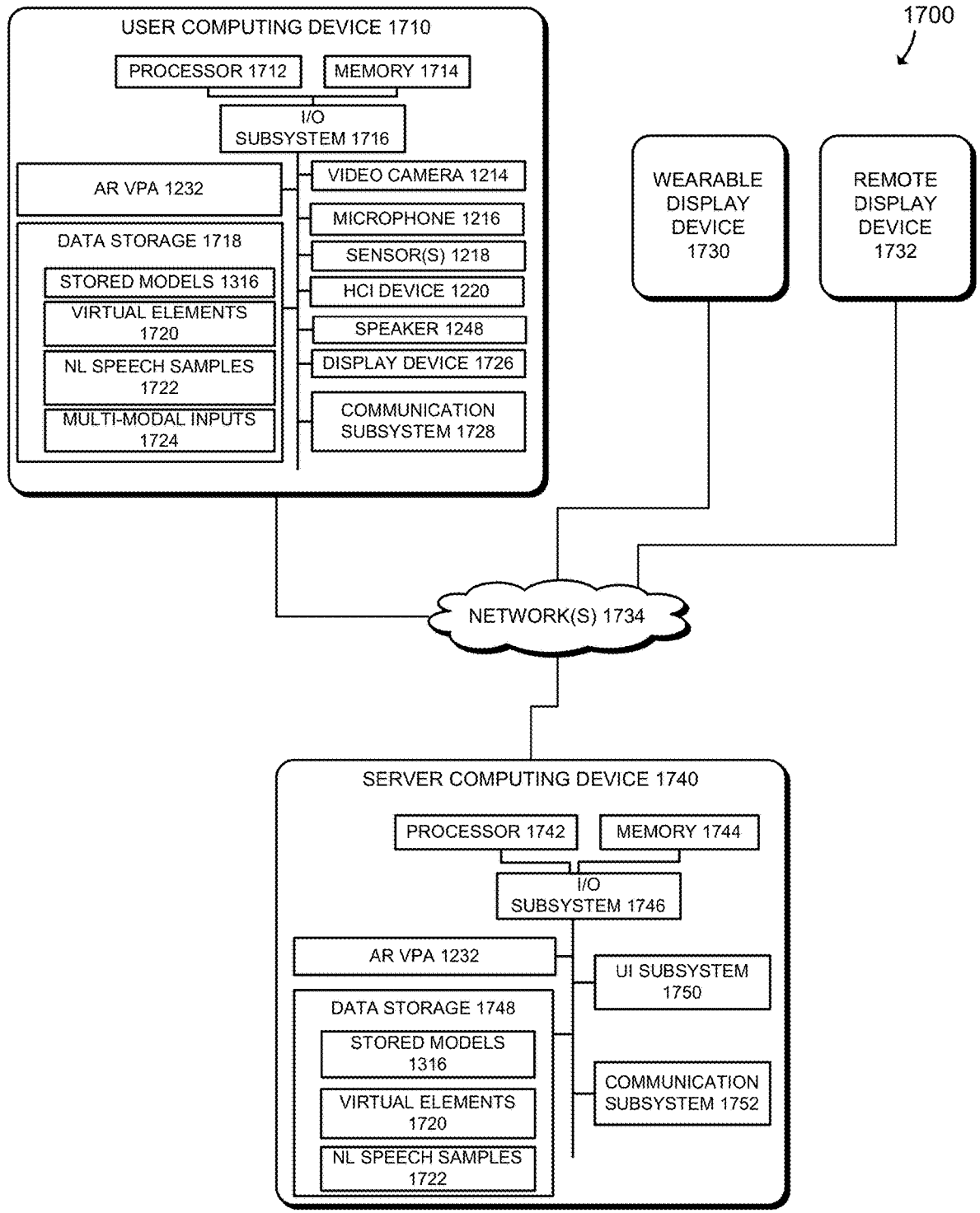
FIG. 17 is a simplified block diagram of an exemplary computing environment in connection with which at least one embodiment of the system of FIG. 1 may be implemented.

The visual output generator 1344 selects the virtual element(s) 1242, 1244 using the virtual elements model 1330 and outputs the selected element(s) 1242, 1244 on one or more of the display devices 1238, 1240 in accordance with the visual output instructions 1340. The virtual elements 1242, 1244 may be obtained from computer memory, e.g., the virtual elements 1242, 1244 and/or the virtual elements model 1330 may be previously created and stored as virtual elements 1720, as shown in FIG. 17, described below. Alternatively or in addition, the visual elements 1242, 1244 may be constructed "on the fly," using, e.g., an augmented reality renderer or other graphics rendering technology. For example, the visual output generator 1344 may select and extract a portion of an external representation 1210 and output the selected part of the external representation 1210 as a virtual element 1242. Aspects of the visual output generator 1344 may be embodied as, for example, the augmented reality generator 112, 800 described above. Illustrative examples of visual elements, e.g., virtual element(s) 1242, 1244, that may be output by the visual element generator 1344 include augmented reality overlays, graphical depictions of real-world objects, such as schematic elements, symbols, text, 2D models, 3D models, see-through overlays, "x-ray" views of objects, relationships between objects or systems, correlations between portions of the document 1208 and selected portions of objects in the real world scene 1200, video clips (e.g., video tutorials), and portions of any of the types of external representations mentioned above, including any portion of the content of the document 1208. An x-ray view may be dynamically selected or updated based on the current step or stage of a multi-step activity in the real world scene 1200. For example, the visual output generator 1344 may output a virtual element 1242, 1244 that provides an x-ray view of a current state of an object that corresponds to a detected step of a multi-step activity, and then update the x-ray view to indicate new states of the object as the activity progresses (to indicate, e.g., flows, activated/deactivated elements, mechanical motion, etc.). Thus, as a multi-step activity progresses, the visual output generator 1344 can overlay different virtual elements corresponding to different steps of the activity.

In some cases, the visual output generator 1344 may output multiple virtual elements 1242 or multiple virtual elements 1244. For instance, the visual output generator 1344 may output a virtual element 1242 and another virtual element 1242 to indicate a correlation between an external representation 1210 of an object in the document 1208 and the object in the real world scene 1200. The visual output generator 1344 may output the virtual element(s) 1242, 1244 in response to user input (e.g., NL speech audio 1224 or HCI data 1228). For instance, the visual output generator 1344 may output a virtual element 1242 on an augmented view 1234 of the real world scene 1200 in response to HCI data 1228 indicating a user selection of a portion of the document 1208 (e.g., by the HCI device 1220 detecting the user tapping on the display screen 1240). Similarly, the visual output generator 1344 may output a virtual element 1244 on an augmented view 1236 of the document 1208 in response to the system 1212 detecting user selection of a corresponding portion of the real world scene 1200 (e.g., the scene understanding module 1304 detecting the person 1204 handling an object).

The virtual element(s) 1242, 1244 may be selected by the visual output generator 1344 to correspond to a particular step of a multi-step activity in the real world scene 1200, in accordance with the visual output instructions 1340 prepared by the reasoner 1338. Based on output of the activity tracking module 1334, the visual output generator 1344 may output a virtual element 1242, 1244 that corresponds to a portion of an object involved in a completed step of a multi-step activity; for instance, a virtual or "augmented reality" overlay 1242 may be placed over a portion of the object in the augmented view 1234 of the real world scene 1200 to indicate one or more objects whose corresponding tasks have already been completed.

In some embodiments, the document 1208 (or multiple different documents 1208) may contain multiple different external representations 1210 of an object detected in the real world scene 1200. In this case, the correlator 1332 may correlate each of the external representations 1210 with the video depiction of the object, and the reasoner 1338 may determine virtual elements corresponding to each of the different external representations of the object, and the visual output generator 1344 may dynamically change the virtual element 1242 to include different virtual elements corresponding to the different external representations 1210. As an example, the person 1204 may wish to view the schematic representation of a real world object, then a 3D model of the object, then a text description of the functionality of the object. As another example, the person 1204 may wish to switch between different schematic views (e.g., plan view, elevation view, perspective view, etc.) of an object. In these cases, the system 1212 can switch between the different external representations of an object in response to user input (e.g., speech, gesture, etc.).

The NL output generator 1346 selects the NL output 1246 to output with the speaker(s) 1248 in accordance with the NL output instructions 1342. NL output 1246 may be obtained from computer memory, e.g., the NL output 1246 may be previously created and stored as NL speech samples 1722 as shown in FIG. 17, described below. For example, the NL speech samples 1722 may include prepared NL explanations of the operation of an object, explanations of correlations between external representations 1210 of the object and the video depictions of the object in the real world scene, or suggestions relating to the multi-step activity, a particular step of such activity, a particular object involved in the activity, or a particular human interaction connected with the activity (e.g., a gesture or movement of the person 1204). Alternatively or in addition, the NL output 1246 may be constructed "on the fly," using, e.g., a natural language generator and text-to-speech (TTS) subsystem. Aspects of the NL output generator 1346 may be embodied as, for example, the speech generator 114, 900 described above. Alternatively or in addition, examples of functionality that may be incorporated into the NL output generator 1346 are described in the aforementioned VPA patent applications of SRI International.

The illustrative stored models 1316 are embodied as computerized components such as data stores, databases, knowledge bases, tables, files, or other suitable data structures, and may be implemented in hardware, firmware, software, or a combination thereof. The illustrative stored models 1316 are established using an "authoring" process that may be conducted, e.g., "offline," prior to real-time use of the system 1212, or during an "initialization" process that occurs at the beginning of a session in which the system 1212 is used. For example, the real world model 1318 may be established by using the camera 1214 to capture an instance of the real world scene 1200 and executing an initialization procedure of the scene understanding module 1304 to populate the real world model 1318. The document model 1320 may be authored or initialized in a similar fashion, except that the initialization procedure of the document understanding module 1306 may execute a variety of content analysis algorithms (e.g., a bag of words or bag of features model) to extract, analyze, and semantically tag the different content elements of the document 1208 and populate the document model 1320 accordingly. The NL dialog model 1322 may be initially populated with training data developed by executing a number of use cases indicating dialog scenarios that are likely to occur in a given application (or "domain") of the system 1212. The correlated model 1324, activity model 1326, VPA workflows 1328, and virtual elements model 1330 may be initialized similarly, with data, content (e.g., visual elements), rules, relationships, and/or business logic that may be customized for a particular domain or application of the system 1212. Portions of the models 1316 may be stored in computer memory of a user computing device 1710 and/or one or more server computing devices 1740 as shown in FIG. 17, described below. Any of the stored models 1316 may be updated during or as a result of use of the system 1212, using, e.g., one or more supervised or unsupervised machine learning techniques.

The NL dialog model 1322 and/or the virtual elements model 1330 may be embodied to include or reference a reusable library of graphical objects (e.g., virtual elements 1720) and natural language dialogs (e.g., NL speech samples 1722). The virtual elements model 1330 may embody core knowledge representations that are organized within particular content areas, topics, and/or domains, in accordance with the requirements of a particular implementation of the system 1212. For example, the virtual elements model 1330 may be embodied as an ontology. In some embodiments, the virtual elements model 1330 organizes its virtual and/or NL elements (e.g., overlays and dialogs) by using different domain-specific templates. Such templates may include specifications for: different ways of presenting different types of procedural steps (e.g., both simple and complex procedural steps), key technical terms and concepts, system organization and functions, and overall procedural sequences for specific domains. Alternatively or in addition, the templates may describe or indicate different ways of integrating multiple external representations in order to make key elements of procedures more salient and memorable to users (e.g., learners) within specific domains. These external representations include, for example: graphics (e.g., videos, 2D diagrams, 3D animations, pointers, etc.), text labels, and dialogs (e.g., recitation of technical manual steps, elaborated explanations and rationales, embedded queries/assessments, e.g., to differentiate learner needs). In some embodiments, the templates may specify different ways of tracking, interpreting, and using data about the user's time-to-complete procedural steps, in order to provide feedback and a guided learning path relevant to specific domains, or for other uses. Alternatively or in addition, the templates may indicate or allow for different ways of eliciting, tracking, interpreting, and/or using both visually recorded and dialog feedback from users about their progress in completing the procedural steps relevant to specific domains.

Constructing the virtual elements model 1330 in this way enables the system 1212 to, among other things, intelligently determine what to do next (e.g. which overlay to display) based at least in part on data collected and/or behavior observed during previous steps of an activity, and/or depending on the type of activity (e.g. troubleshooting vs procedural task). For instance, the system 1212 may intelligently select a particular type of external representation to overlay on the real world scene 1200, based on the domain, content, topic, or task at hand in the real world scene 1200. As an example, the system 1212 may determine that certain types of external representations (e.g., animations) are more helpful for certain types of activities (e.g., learning tasks) or domains while other types (e.g., 2D schematics) are more useful for other types of activities.

As another example, the virtual elements model 1330 may specify external representations for procedural tasks that follow a strictly "step-by-step representation/dialog" logic, and specify other external representations for other types of activities, such as troubleshooting tasks. The external representations (e.g., visual overlays) may include occasional "predictive dialog queries" which may be useful in stimulating a common type of learning or troubleshooting reasoning by the user. For instance, suppose a novice mechanic is trying to diagnose the source of a break in an electrical circuit. The system 1212 can, before (or instead of) immediately issuing external representations to indicate next steps, prompt the novice to consider what next steps make the most sense given the results of past diagnostic tests.

The external representations (e.g., overlays) may also include "schematic electrical flow overviews" to help the user figure out where in an electrical circuit he or she is operating in the real world scene 1200 and figure out next steps to try. These types of external representations may be used alternatively or in addition to a "step-by-step recitation" type of template, as they provide a different approach to appearance, organization, source, and function of the template.

As a further example, the system 1212 may, based on the virtual elements model 1330, have a choice of which type of external representation to overlay based on the current context (as evidenced by one or more of the multi-modal inputs 1222, 1224, 1226, 1228), and thus may select a particular type of external representation based on user preferences, which may be learned over time. For example, the system over time may determine that a user A prefers visual graphics while a user B prefers text. As another example, a user may request a "replay," of part of an external representation and at some point, the user may want to detach an existing visual representation from its dialog representation (e.g., to abbreviate the dialog and "just see the pictures" on request). As another example, with the virtual elements model 1330, the system 1212 can organize multiple different external representations that relate to a task, and then determine a user-, task-, or domain-specific order in which to present the external representations to the user (e.g., start with a high level schematic, then move to a detailed schematic, or vice versa, start with detail then zoom out).

Figure 14:
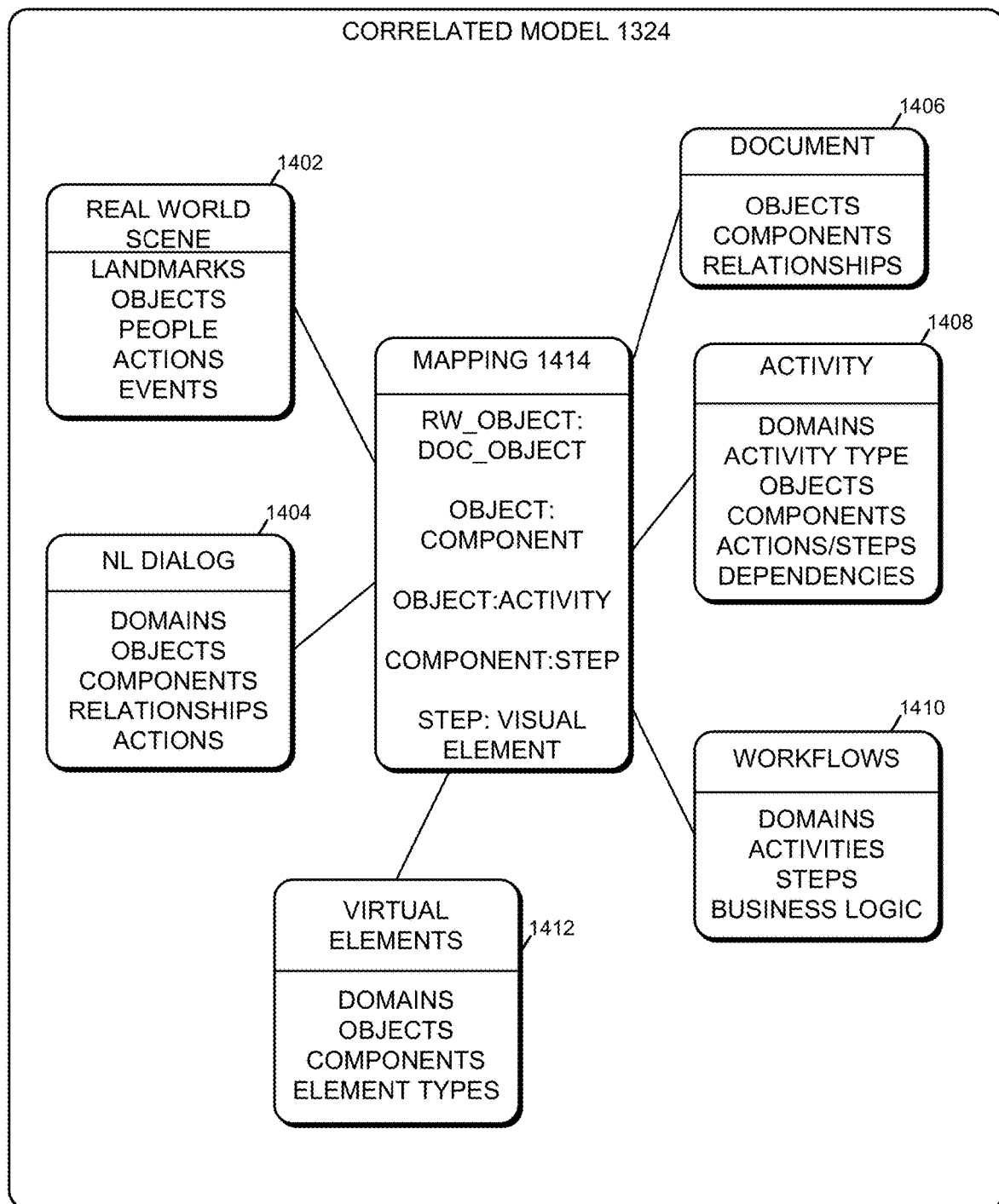
FIG. 14 is a simplified schematic diagram of at least one embodiment of the correlated model of FIG. 13.

Referring now to FIG. 14, an embodiment of the correlated model 1324 is shown in greater detail. The illustrative correlated model 1324 and portions thereof may be embodied as one or more data structures, such as a searchable database, table, or knowledge base, which may be implemented in hardware, firmware, software, or a combination thereof. The illustrative correlated model 1324 includes a mapping 1414, which establishes relationships between and/or among semantic elements of the various stored models 1316, e.g., the real world model 1318, the document model 1320, the NL dialog model 1322, the activity model 1326, the VPA workflows 1326, and the virtual elements model 1330. Some examples of semantic elements of the various models 1316 that may be correlated by the correlated model 1324 are shown in FIG. 14. For instance, semantic elements 1402 associated with aspects of the real world scene 1200 may include descriptions of landmarks, objects, people, actions, and events. Semantic elements 1404 associated with spoken NL dialog include objects, relationships between objects (e.g., component-whole, etc.), and actions. Semantic elements 1406 associated with the document 1208 may include descriptions of objects in the document (e.g., specific portions of schematic diagrams or paragraphs of text) and descriptions of relationships between those objects (e.g., connections between different portions of a schematic diagram). Semantic elements 1408 may include a description of one or more multi-step activities in the context of which the system 1212 may be used. Such descriptions may include objects utilized, observed or handled during an activity, various actions or steps performed during the activity, and dependencies between or among actions or steps of the activity (e.g., step A needs to be performed before step B). Semantic elements 1410 may include information identifying business logic or executable tasks, such as visual output instructions 1340 (e.g., "display overlay 1242 on device 1238" or "display overlay 1244 on device 1240") or NL output instructions (e.g., "say 'the battery is on the right side of the car'") and activities or steps of an activity with which the business logic or executable tasks are associated. The mapping 1414 may be embodied as, for example, an ontology that defines the various relationships between the semantic elements 1402, 1404, 1406, 1408, 1410, 1412. The mapping 1414 may define relationships between variations in terminology that may be used in the real world scene 1200 and terminology used in the document 1208. For example, where the person 1204 may refer to an element in the real world as a "battery," the document 1208 or more particularly the external representation 1210 may refer to the same element as a "power source." The mapping 1414 establishes semantic relationships between semantically equivalent terminologies so that elements of the real world can be associated with the corresponding elements of the external representations in real time. In addition to semantic relationships between objects in the real world and corresponding external representations, the mapping 1414 may define relationships between the real world objects, the corresponding external representations, the NL speech terminology that may be used to refer to either the real world object or the corresponding external representation, real world activities or steps of activities in which the objects are involved, and virtual elements. For example, different types of virtual elements may be associated with the same physical object or step of an activity, or different virtual elements may be associated with only certain types of objects, components, or activities, depending on the domain. Additionally, the correlated model 1324 may indicate dependencies between steps of an activity, which may be used by the system 1212 to determine an order of presentation of virtual elements and/or NL dialog output. The mapping 1414 may be initially developed through a manual authoring process, and may be updated in response to use of the system 1212 over time using, e.g., one or more machine learning techniques. The correlated model 1324 may be stored in computer memory as one of the stored models 1316, as shown in FIG. 17.

Figure 15:
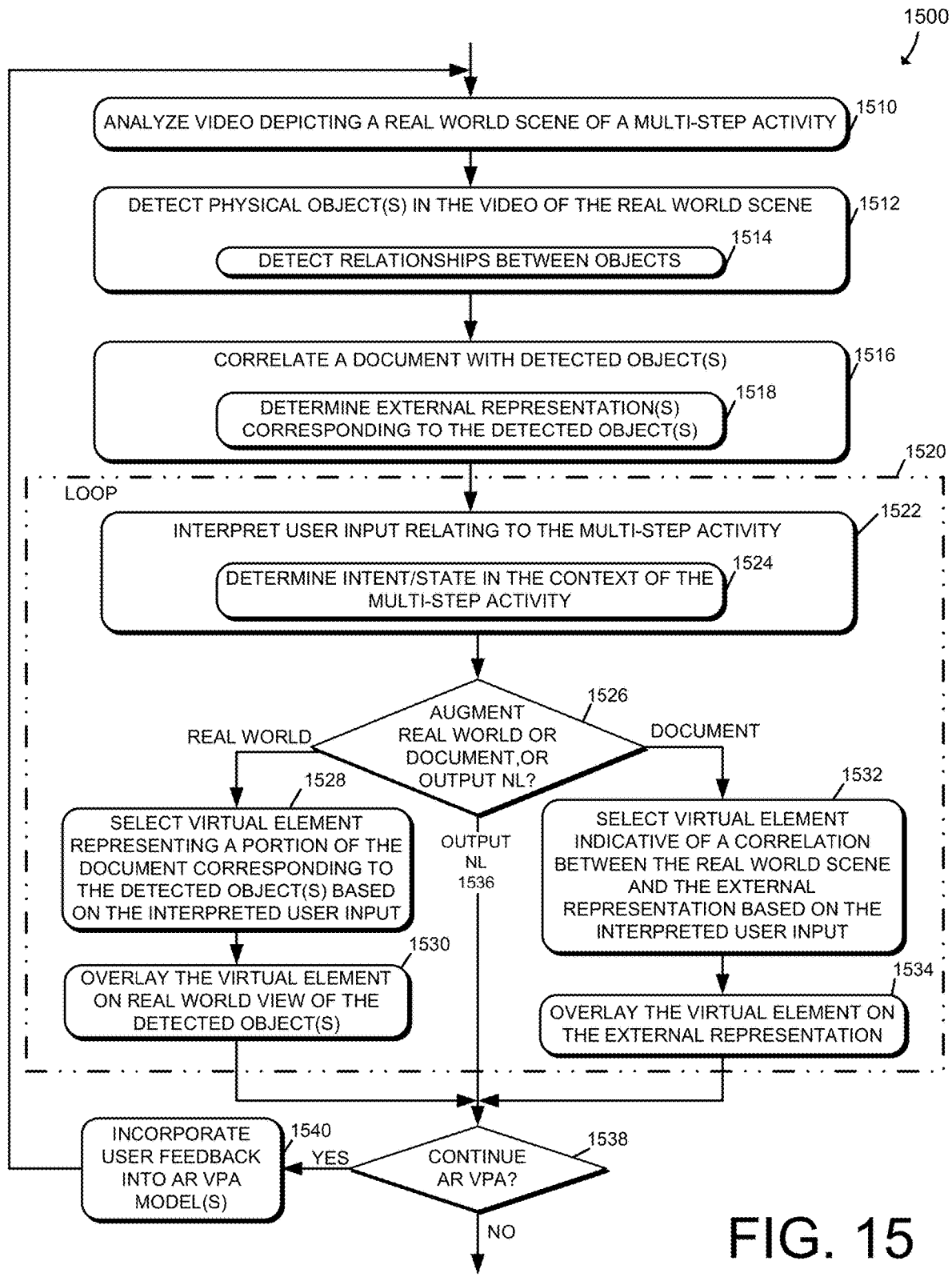
FIG. 15 is a simplified flow diagram of at least one embodiment of a method by which the system of FIG. 1 may perform augmented reality virtual personal assistance as disclosed herein.

Referring now to FIG. 15, an example of a method 1500 by which the system 1212 may provide augmented reality virtual personal assistance is shown. The method 1500 may be embodied as computerized programs, routines, logic and/or instructions executed by the computing system 1212, for example by the augmented reality virtual personal assistant 1232. At block 1510, the system 1212 analyzes video depicting a real world scene (illustratively, a scene of a multi-step activity). To do this, the system 1212 executes one or more computer vision algorithms, including object detection algorithms, scene recognition and localization algorithms, and/or occlusion reasoning algorithms. At block 1512, the system 1212 detects one or more physical objects that are present in the real world scene 1200 as captured on the video (e.g., in accordance with the field of view of the video camera). Where multiple objects are detected, the system 1212 may detect connections or relationships between the objects at block 1514. The system 1212 interfaces with the real world model 1318 to identify and classify the detected objects.

A loop 1520 indicates a portion of the method 1500 that may be repeated iteratively, for example if there are multiple rounds of dialog between the person 1204 and the AR VPA 1232 with respect to a particular step or activity of a multi-step activity, or with respect to the objects in the real world scene 1200. At block 1522, the system 1212 interprets user input relating to the multi-step activity. The user input may include, for example, NL dialog, gestures, or other human-computer interactions, or a combination of different human interactions. For example, the user input may include a verbal request, such as "show it to me," or movement of the user with respect to a part of the real world scene 1200 (e.g., picking up an object). The user input is interpreted by, at block 1524, determining an intent of the person 1204 with respect to the real world scene 1200 and/or a current state of the real world scene 1200. To do this, the system 1212 generates semantic interpretations for the different forms of input, and merges and correlates all of the different multi-modal inputs using, e.g., the correlated model 1324.

At block 1526, the system 1212 determines what to do in response to the user input interpreted at block 1522. To do this, the system 1212, e.g., the reasoner 1338, evaluates the intent/state determined at block 1522 by interfacing with, e.g., the activity model 1326 and the VPA workflows 1326, to determine an appropriate course of action. If at block 1526 the system 1212 determines to output a virtual element (e.g., a graphical overlay) on a view of the real world, the system 1212 proceeds to block 1528. At block 1528, the system 1212 selects a virtual element 1242 (e.g., an augmented reality overlay) that represents a portion of the document correlated with the detected object(s) at block 1516, in accordance with the system 1212's interpretation of the user input at block 1522. At block 1530, the system 1212 displays the virtual element selected at block 1528 on the real world view of the detected object(s). In doing so, the system 1212 may align the virtual element with the corresponding object in the real world view so that the virtual element directly overlays the real world view of the object.

If at block 1526 the system 1212 determines to augment a view of the document correlated with the detected object(s) at block 1516, the system 1212 proceeds to block 1532. At block 1532, the system 1212 selects a virtual element that is indicative of a correlation between the real world scene 1200 and the external representation 1210, based on the interpretation of user input obtained at block 1522. For example, the virtual element selected at block 1532 may include highlighting, or a graphical element, such as a circle, square, underlining or other marking. At block 1534, the system 1212 incorporates the virtual element selected at block 1532 with the display of the external representation 1210 (e.g., by annotating or overlaying the external representation 1210). In doing so, the system 1212 may align the virtual element with a particular portion of the external representation to indicate the correlation with an object detected in the real world view. For example, if the external representation 1210 is part of an electronic document displayed on the display device 1240, the system 1212 may update the display of the electronic document to place the virtual element directly over the relevant portion of the electronic document. If the external representation 1210 is simply a paper or book captured on the video 1222 of the real world scene 1200, the system 1212 may augment the view of the real world scene 1200 by positioning the virtual element over a portion of a frame of the video 1222 in which the relevant portion of the external representation is depicted.

If at block 1526 the system 1212 determines to output NL speech, the system selects and outputs the appropriate NL speech 1536 (using, e.g., the NL output generator 1346 and one or more speech samples 1722). At block 1538, the system 1212 determines whether to continue executing the AR VPA 1232. If executing the AR VPA 1232 is to continue, the system 1212 may record user feedback observed in response to the presentation of virtual elements at blocks 1530, 1534 and/or the presentation of NL output at 1536, analyze the user feedback over time (using, e.g., machine learning algorithms), and incorporate the output of the machine learning into one or more of the stored models 1316 and/or other components of the AR VPA 1232. The system 1212 then returns to block 1510 and continues analyzing subsequent frame(s) of the video 1222. If the system 1212 determines at block 1538 not to continue the AR VPA 1232, the method 1500 may conclude (e.g., power off) or suspend (e.g., the system 1212 may enter a "sleep" mode after a timeout period, until further inputs are detected).

Example Usage Scenarios

Figure 16:
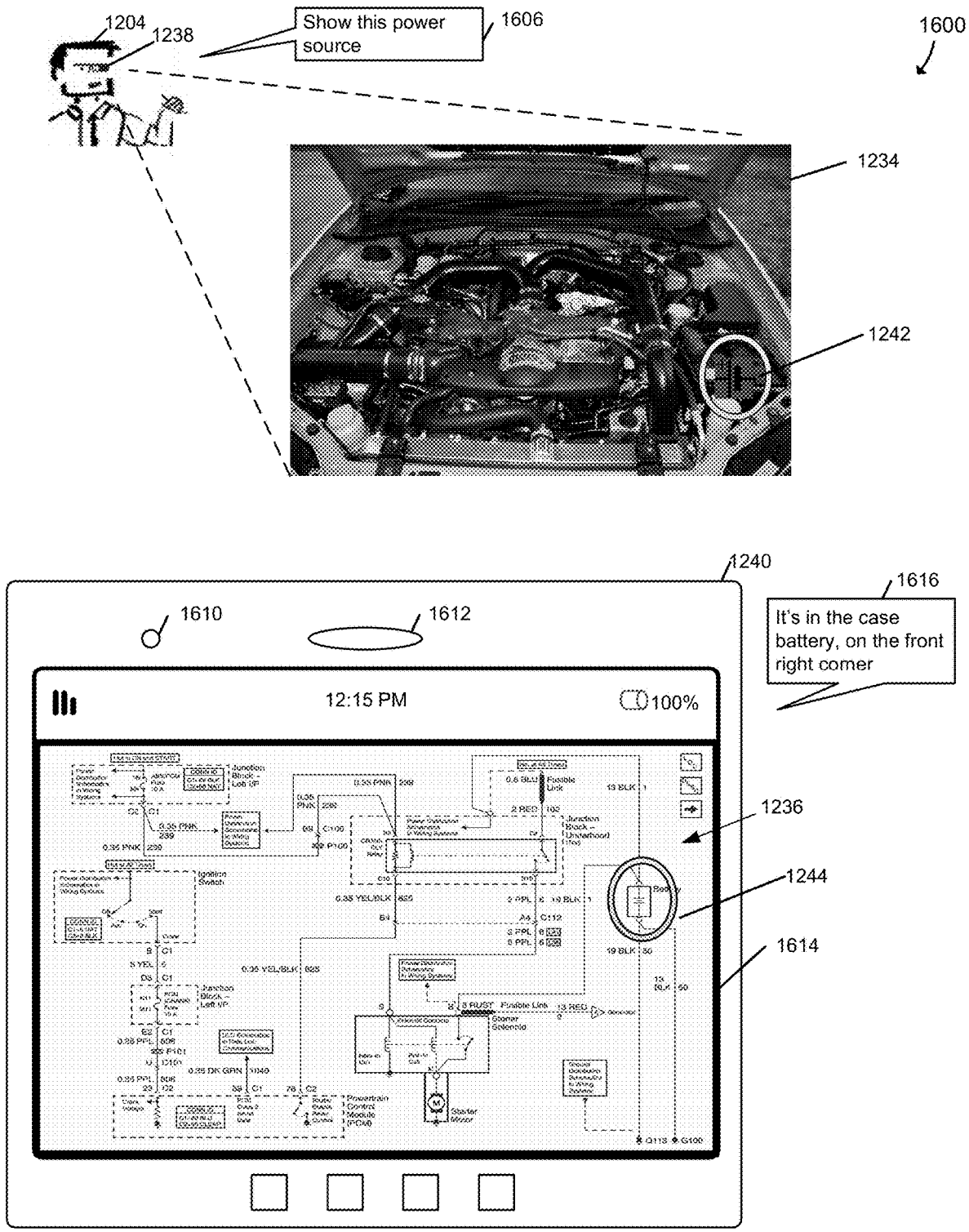
FIG. 16 is a simplified schematic illustration of an example implementation of the system of FIG. 1.

Referring now to FIG. 16, an embodiment 1600 of the augmented reality virtual personal assistant computing system 1212 is shown in operation. In the illustrative embodiment 1600, the person 1204 is wearing the display device 1238 (to which the camera 1214 may be attached) and is also using a display device 1240. The display device 1240 is embodied as a mobile electronic device (e.g., a tablet computer), and includes a microphone 1610 and a speaker 1612. The person 1204 says, "show this power source." The system 1212 acquires the NL speech input 1606 via the microphone 1610. The system 1212 interprets the NL speech input 1606 and in response, presents the augmented view 1234 of a real world scene (which depicts internal components of an automobile) via the AR device 1238. The augmented view 1234 includes a virtual element 1242, which is a graphical overlay including a schematic symbol representative of the object (a car battery) underlying the symbol. The display device 1240 includes an interactive display screen 1614 on which an augmented view 1236 of a document 1208 is displayed. In this case, the document 1208 is a schematic electrical diagram. In response to the user input 1606, the system 1212 highlights the relevant portion of the diagram with a virtual element 1244, thereby connecting a relevant portion of the schematic diagram with the corresponding portion of the real world view. The embodiment 1600 may be useful in, for example, online tutorial applications in which the AR VPA 1232 carries on a dialog with the person 1204 and at the same time provides augmented reality overlays on the schematic and the real world view to facilitate interpretation of schematics and association with the corresponding real world objects. Other uses include trouble shooting and diagnostic applications, in which the system 1212 provides virtual overlays to aid the person 1204 in detecting the location of a problem in a complicated system. Still other uses include facilitating the performance of multi-step activities such as assembly, building, construction, and development activities, medical and dental procedures, sports coaching, game-time sports strategizing, cooking, crafts, home improvement projects, conducting of experiments and tests, and any other activities that involve a number of steps or which require the use of a reference document.

Implementation Examples

Referring now to FIG. 17, a simplified block diagram of an embodiment of the augmented reality virtual personal assistant computing system 1212 is shown. While the illustrative embodiment 1700 is shown as involving multiple components and devices, it should be understood that the computing system 1212 may constitute a single computing device, alone or in combination with other devices. For example, the computing device 1230 shown in FIG. 1 may be embodied as a single computing device (e.g., computing device 1710) or a combination of computing devices (e.g., devices 1710, 1740). The embodiment 1700 includes a user computing device 1710, which embodies features and functionality of a "client-side" or "front end" portion of the AR VPA 1232 depicted in FIG. 1, and a server computing device 1740, which embodies features and functionality of a "server-side" or "back end" portion of the AR VPA 1232. The embodiment 1700 includes a wearable display device 1730 and a remote display device 1732, each of which, along with a display device 1726 of the user computing device 1710, may embody the functionality of the display device 1238 and/or the display device 1240 described above. Each or any of the computing devices 1710, 1730, 1732, 1740 may be in communication with one another via one or more networks 1734.

The AR VPA 1232 or portions thereof may be distributed across multiple computing devices that are connected to the network(s) 1734 as shown. In other embodiments, however, the AR VPA 1232 may be located entirely on, for example, the computing device 1710 or a computing device 1730, 1732. In some embodiments, portions of the AR VPA 1232 may be incorporated into other systems or computer applications. Such applications or systems may include, for example, commercial off the shelf (COTS) virtual personal assistant applications and/or COTS augmented reality systems. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application may be embodied as firmware, as one or more components of an operating system, a runtime library, an application programming interface (API), as a self-contained software application, or as a component of another software application, for example.

The illustrative user computing device 1710 includes at least one processor 1712 (e.g. a microprocessor, microcontroller, digital signal processor, etc.), memory 1714, and an input/output (I/O) subsystem 1716. The computing device 1710 may be embodied as any type of computing device capable of performing the functions described herein, such as a personal computer (e.g., desktop, laptop, tablet, smart phone, body-mounted device, wearable device, etc.), a server, an enterprise computer system, a network of computers, a combination of computers and other electronic devices, or other electronic devices. Although not specifically shown, it should be understood that the I/O subsystem 1716 typically includes, among other things, an I/O controller, a memory controller, and one or more I/O ports. The processor 1712 and the I/O subsystem 1716 are communicatively coupled to the memory 1714. The memory 1714 may be embodied as any type of suitable computer memory device (e.g., volatile memory such as various forms of random access memory).

The I/O subsystem 1716 is communicatively coupled to a number of hardware and/or software components, including the AR VPA 1232, the video camera 1214, the location/orientation sensor(s) 1218, the microphone 1216, the speaker(s) 1248, the display device 1726, and the human-computer interface device 1220. The camera 1214, the sensor(s) 1218, the microphone 1216, the speaker(s) M 1248, the display device 1726, and the HCI device 1220 may form part of a user interface subsystem, which includes one or more user input devices (e.g., a touchscreen, keyboard, virtual keypad, microphone, etc.) and one or more output devices (e.g., speakers, displays, LEDs, etc.). The I/O subsystem 1716 is also communicatively coupled to one or more storage media 1718 and a communication subsystem 1728. It should be understood that each of the foregoing components and/or systems may be integrated with the computing device 1710 or may be a separate component or system that is in communication with the I/O subsystem 1716 (e.g., over a network 1734 or a bus connection).

The storage media 1718 may include one or more hard drives or other suitable data storage devices (e.g., flash memory, memory cards, memory sticks, and/or others). In some embodiments, portions of the AR VPA 1232, e.g., the stored models 1316, the virtual elements 1720, the NL speech samples 1722, and the multi-modal inputs 1724 (e.g., the video 1222, audio 1224, location/orientation data 1226, and HCI data 1228), and/or other data, reside at least temporarily in the storage media 1718. Portions of the AR VPA 1232, e.g., the stored models 1316, the virtual elements 1720, the NL speech samples 1722, and the multi-modal inputs 1724 (e.g., the video 1222, audio 1224, location/orientation data 1226, and HCI data 1228), and/or other data may be copied to the memory 1714 during operation of the computing device 1710, for faster processing or other reasons.

The communication subsystem 1728 communicatively couples the user computing device 1710 to one or more other devices, systems, or communication networks, e.g., a local area network, wide area network, personal cloud, enterprise cloud, public cloud, and/or the Internet, for example. Accordingly, the communication subsystem 1734 may include one or more wired or wireless network interface software, firmware, or hardware, for example, as may be needed pursuant to the specifications and/or design of the particular embodiment of the system 1212.

The wearable display device 1730, the remote display device 1732, and the server computing device 1740 each may be embodied as any suitable type of computing device capable of performing the functions described herein, such as any of the aforementioned types of devices or other electronic devices. For example, in some embodiments, the server computing device 1740 may include one or more server computers including storage media 1748, which may be used to store portions of the AR VPA 1232, the stored models 1316, the virtual elements 1720, the NL speech samples 1722, and/or other data. The illustrative server computing device 1740 also includes a user interface subsystem 1750, and a communication subsystem 1752. In general, components of the server computing device 1740 having similar names to components of the computing device 1710 described above, such as a processor 1742, a memory 1744, and an I/O subsystem 1746, which may be embodied similarly. Further, each of the computing devices 1732, 1740 may include components similar to those described above in connection with the user computing device 1710 and/or the server computing device 1740. The computing system 1700 may include other components, sub-components, and devices not illustrated in FIG. 17 for clarity of the description. In general, the components of the computing system 1700 are communicatively coupled as shown in FIG. 17 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a computing system for virtual personal assistance includes, embodied in one or more computing devices: a scene understanding module to algorithmically analyze a video depicting a real world scene of a multi-step activity and detect, in the video, a physical object involved in the multi-step activity; a correlation module to determine a correlation between a document including an external representation of the physical object with the video depiction of the object in the real world scene; an input understanding module to, using the correlation, interpret user input relating to a step of the multi-step activity and relating to at least a portion of the external representation; and a visual output generator to, in response to the interpreted user input, display a virtual element on one or more of a real world view of the physical object and a view of the document, the virtual element based on the correlation.

An example 2 includes the subject matter of example 1, wherein the virtual element comprises an augmented reality overlay, and the visual output generator is to display the augmented reality overlay on the real world view of the object. An example 3 includes the subject matter of example 1 or example 2, wherein the virtual element includes an annotated portion of the external representation, and the visual output generator is to display the annotated portion of the external representation on the view of the document. An example 4 includes the subject matter of any of examples 1-3, wherein the virtual element includes data relating to the correlation between the external representation of the object and the real world view of the object. An example 5 includes the subject matter of any of examples 1-4, wherein the computing system is to provide virtual personal assistance with an activity involving manipulation of a real-world physical object including multiple components, and: the scene understanding module is to detect, in the video, one or more components of the physical object; the correlation module is to determine a correlation between the external representation of the one or more components of the object with the video depiction of the real-world physical object; and the input understanding module is to interpret user input based on the correlation, the user input relating to the one or more of the components of the physical object. An example 6 includes the subject matter of any of examples 1-5, wherein the visual output generator is to, in response to the interpreted user input, display an annotated portion of the external representation. An example 7 includes the subject matter of any of examples 1-6, wherein the visual output generator is to overlay a second virtual element on a display of the external representation, and wherein the second virtual element is to indicate a correlation between the external representation and the object in the real world scene. An example 8 includes the subject matter of any of examples 1-7, wherein the user input includes natural language speech, the input understanding module is to generate a semantic interpretation of the natural language speech, the correlation module is to correlate the semantic interpretation of the natural language speech with the external representation, and the visual output generator is to overlay the virtual element on a real world view of the object in response to the natural language speech. An example 9 includes the subject matter of any of examples 1-8, wherein the scene understanding module is to generate a semantic interpretation of the real world scene, the input understanding module is to generate a semantic interpretation of the user input, the computing system includes a document understanding module to generate a semantic interpretation of the external representation, and the correlation module is to correlate the semantic interpretation of the real world scene and the semantic interpretation of the user input with the semantic interpretation of the external representation.

An example 10 includes the subject matter of any of examples 1-9, wherein the external representation includes a plurality of schematic diagrams of the object, the scene understanding module is to detect, in the video, a step of the multi-step activity, the correlation module is to select a schematic diagram corresponding to the detected step of the multi-step activity, and the visual output generator is to overlay a virtual element representing a portion of the selected schematic diagram on a real world view of the object. An example 11 includes the subject matter of any of examples 1-10, including an activity tracking module to track completed steps of the multi-step activity, wherein the visual output generator is to overlay a new virtual element corresponding to a portion of the object involved in a completed step of the multi-step activity on a real world view of the portion of the object involved in the completed step of the multi-step activity. An example 12 includes the subject matter of any of examples 1-11, wherein the scene understanding module is to detect, in the video, a step of the multi-step activity, and the visual output generator is to overlay a virtual element comprising an x-ray view of a state of the object corresponding to the detected step of the multi-step activity on a real world view of the object. An example 13 includes the subject matter of any of examples 1-12, wherein the scene understanding module is to detect, in the video, a plurality of different steps of the multi-step activity, the correlation module is correlate external representations of different portions of the detected object with different portions of the video depiction of the object in response to the different steps of the multi-step activity; and the visual output generator is to overlay a different virtual element on a real world view of the object for each of the different portions of the detected object. An example 14 includes the subject matter of any of examples 1-13, wherein the scene understanding module is to detect, in the video, a plurality of different steps of the multi-step activity, the correlation module is correlate external representations of the object in different steps of the multi-step activity with different portions of the video depiction of the object in response to the different steps of the multi-step activity; and the visual output generator is to overlay a different virtual element on a real world view of the object for each of the different steps of the multi-step activity. An example 15 includes the subject matter of any of examples 1-14, and includes a natural language generator to output a natural language explanation of the correlation between the external representation of the object and the video depiction of the object in the real world scene. An example 16 includes the subject matter of any of examples 1-15, and includes a first computing device and a second computing device communicatively coupled to the first computing device, wherein the computing system is to display the external representation on the first computing device and display an augmented reality view of the real world scene including the virtual element on the second computing device. An example 17 includes the subject matter of any of examples 1-16, wherein the computing system is to display the external representation and an augmented reality view of the real world scene including the virtual element on the same computing device.

In an example 18, an augmented reality virtual personal assistant embodied in one or more machine accessible storage media includes instructions executable by one or more computing devices to: analyze a video depicting a real world scene of a multi-step activity; algorithmically detect a physical object involved in the multi-step activity; correlate a document comprising content relating to the object detected in the video with the video depiction of the object in the real world scene; and in response to user input relating to the multi-step activity, present a virtual overlay on one or more of a view of the real world scene and a view of the document, the virtual overlay indicative of the correlation between the content of the document and the object in the real world scene.

An example 19 includes the subject matter of example 18, wherein the instructions are executable by one or more computing devices to, in response to the user input, select a portion of the document, and overlay a virtual element indicative of content of the selected portion of the document on a real world view of a portion of the object that corresponds to the selected portion of the document. An example 20 includes the subject matter of example 18 or example 19, wherein the instructions are executable by one or more computing devices to, in response to the user input, select a portion of the video depiction of the object, and overlay a virtual element on a display of a portion of the document corresponding to the selected portion of the object, wherein the virtual element is indicative of a correlation between the portion of the document and the selected portion of the object. An example 21 includes the subject matter of any of examples 18-20, wherein the instructions are executable by one or more computing devices to detect human interaction with the document, interpret the human interaction, determine a suggestion relating to the multi-step activity in response to the human interaction, and output the suggestion on a view of the real world scene. An example 22 includes the subject matter of any of examples 18-21, wherein the instructions are executable by one or more computing devices to detect human interaction with the object in the real world environment, interpret the human interaction, determine a suggestion relating to the multi-step activity in response to the human interaction, and output the suggestion on a display of the document.

In an example 23, a method for augmented reality virtual personal assistance includes, with at least one computing device: analyzing a video depicting a real world scene of a multi-step activity; algorithmically detecting a physical object involved in the multi-step activity; correlating an external representation of the object detected in the video with the video depiction of the object in the real world scene, the external representation depicting the object in a different context than the real world scene; and overlaying a portion of a real world view of the object with a virtual element indicative of the correlation between the detected object and the external representation of the object.

An example 24 includes the subject matter of example 23, and includes annotating a view of a portion of the external representation with a different virtual element indicative of the correlation between the detected object and the external representation of the object. An example 25 includes the subject matter of example 23 or example 24, and includes algorithmically detecting a second physical object in the video, determining a relationship between the second object and the first object, and overlaying a portion of a real world view of the first and second objects with a virtual element indicative of the relationship between the second object and the first object. An example 26 includes the subject matter of any of examples 23-25, wherein the object is an operable device, the external representation comprises an animation of the operation of the device, and the method comprises overlaying a portion of the real world view of the device with the animation of the operation of the device. An example 27 includes the subject matter of any of examples 23-26, and includes selecting an external representation of the object that is indicative of a part-whole relationship between two or more components of the detected object; and overlaying the real-world view of the object with the selected portion of the external representation.

General Considerations

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A computing system for virtual personal assistance, the computing system comprising, embodied in one or more computing devices:
    a scene understanding module to algorithmically analyze a video depicting a real-world scene of a multi-step activity and automatically detect, at different time instants, visual features in the video, to identify a physical object involved in the multi-step activity;

a correlation module to determine, from at least one of the algorithmic analysis of the video and a condition of physical objects detected during at least one of the different time instants, a current step of the multi-step activity and to determine a correlation between a document comprising an external representation of the physical object and the video depiction of the physical object in the real-world scene;

an input understanding module to identify, from a semantic interpretation of at least one of audio and video of the real-world scene or a semantic interpretation of the document, at least one portion of the document relevant to the current step of the multi-step activity and to, using information regarding the current step, automatically interpret user input relating to the current step of the multi-step activity; and a display to, in response to the interpreted user input, display a virtual element on one or more of a real-world view of the physical object and a view of the document, the virtual element based on the at least one relevant portion of the document, wherein the user input comprises one or more human-computer interactions (HCI), including at least one of a touch or a tap of a physical object on the display, or natural language speech associated with the user, including a voice command, and based on the one or more HCI or natural language speech, the correlation module is configured to:

apply mapping to develop correlations that link respective intents of one or more HCI or natural language speech, and merge the correlations to develop a global input intent associated with the respective intents of the one or more HCI or natural language speech for a given time instant;

and wherein the input understanding module uses the merged correlations to determine HCI that relate to objects in the video and natural language speech that refers to a particular section of the document.

2. The computing system of claim 1, wherein the virtual element comprises an augmented reality overlay, and the computing device further comprises a visual output generator that is configured to display the augmented reality overlay on the real-world view of the object.

3. The computing system of claim 1, wherein the virtual element comprises an annotated portion of the external representation, and the computing device further comprises a visual output generator that is configured to display the annotated portion of the external representation on the view of the document.

4. The computing system of claim 1, wherein the computing device further comprises a visual output generator that is configured to, in response to the interpreted user input, display an annotated portion of the external representation, the annotated portion based on the correlation.

5. The computing system of claim 1, wherein the computing device further comprises a visual output generator that is configured to overlay the virtual element on a display of the external representation, and wherein the virtual element is to indicate a correlation between the external representation and the object in the real-world scene.

6. The computing system of claim 1, wherein the input understanding module is to generate a semantic interpretation of the natural language speech, the correlation module is to correlate the semantic interpretation of the natural language speech with the external representation, and the computing device further comprises a visual output generator that is configured is to overlay the virtual element on a real-world view of the object in response to the natural language speech.

7. The computing system of claim 1, wherein the external representation comprises a plurality of schematic diagrams of the object, the scene understanding module is to detect, in the video, a step of the multi-step activity, the correlation module is to select a schematic diagram corresponding to the detected step of the multi-step activity, and the computing device further comprises a visual output generator that is configured to overlay a virtual element representing a portion of the selected schematic diagram on a real-world view of the object.

8. The computing system of claim 1, comprising an activity tracking module to track completed steps of the multi-step activity, wherein the computing device further comprises a visual output generator that is configured is to overlay a new virtual element corresponding to a portion of the object involved in a completed step of the multi-step activity on a real-world view of the portion of the object involved in the completed step of the multi-step activity.

9. The computing system of claim 1, wherein the scene understanding module is to detect, in the video, a step of the multi-step activity, and the computing device further comprises a visual output generator that is configured is to overlay a virtual element comprising an x-ray view of a state of the object corresponding to the detected step of the multi-step activity on a real-world view of the object.

10. The computing system of claim 1, wherein the scene understanding module is to detect, in the video, a plurality of different steps of the multi-step activity, the correlation module is to correlate external representations of different portions of the detected object with different portions of the video depiction of the object in response to the different steps of the multi-step activity; and the computing device further comprises a visual output generator that is configured to overlay a different virtual element on a real-world view of the object for each of the different portions of the detected object.

11. The computing system of claim 1, wherein the scene understanding module is to detect, in the video, a plurality of different steps of the multi-step activity, the correlation module is correlate external representations of the object in different steps of the multi-step activity with different portions of the video depiction of the object in response to the different steps of the multi-step activity; and the computing device further comprises a visual output generator that is configured to overlay a different virtual element on a real-world view of the object for each of the different steps of the multi-step activity.

12. The computing system of claim 1, comprising a natural language generator to output a natural language explanation of the correlation between the external representation of the object and the video depiction of the object in the real-world scene.

13. The computing system of claim 1, comprising a first computing device and a second computing device communicatively coupled to the first computing device, wherein the computing system is to display the external representation on the first computing device and display an augmented reality view of the real-world scene comprising the virtual element on the second computing device.

14. The computing system of claim 1, wherein the computing system is to display the external representation and an augmented reality view of the real-world scene comprising the virtual element on the same computing device.

15. The computing system of claim 1, further comprising an HCI device comprising at least one of a touchscreen display, a touch-sensitive keypad, a kinetic sensor, or an eye-tracking sensor, wherein the HCI device is configured to detect at least one of gestures, taps, mouse clicks, keypad input, eye movement.

16. An augmented reality virtual personal assistant embodied in one or more non-transitory machine accessible storage media and comprising instructions executable by one or more computing devices to:
 algorithmically analyze a video depicting a real-world scene of a multi-step activity and automatically detect, at different time instants, visual features in the video, to identify a physical object involved in the multi-step activity;
 determine, from at least one of the algorithmic analysis of the video and a condition of physical objects detected during at least one of the different time instants, a current step of the multi-step activity;
 correlate a document comprising content relating to the physical object detected in the video with the video depiction of the object in the real-world scene;
 identify, from a semantic interpretation of at least one of audio and video of the real-world scene or a semantic interpretation of the document, at least one portion of the document relevant to the current step of the multi-step activity;
 using information regarding the current step, automatically interpret a user input relating to the current step of the multi-step activity, wherein the user input comprises at least one of a human-computer interaction (HCI), including at least one of a touch or a tap of a physical object on a display in operable communication with the one or more computing devices or natural language speech, including a voice command, and
 in response to the user input relating to the current step of the multi-step activity, present a virtual overlay on one or more of a view of the real-world scene and a view of the document, the virtual overlay indicative of the at least one relevant portion of the document;
 based on the at least one HCI or natural language speech:
  apply mapping to develop correlations that link respective intents of at least one HCI or natural language speech, and
  merge the correlations to develop a global input intent associated with the respective intents of the at least one HCI or natural language speech for a given time instant; and
  using the merged correlations, determine HCI that relate to objects in the video and natural language speech that refers to a particular section of the document.

17. The augmented reality virtual personal assistant of claim 16, wherein the instructions are executable by one or more computing devices to, in response to the user input, select a portion of the document, and overlay a virtual element indicative of content of the selected portion of the document on a real world view of a portion of the object that corresponds to the selected portion of the document.

18. The augmented reality virtual personal assistant of claim 16, wherein the instructions are executable by one or more computing devices to, in response to the user input, select a portion of the video depiction of the object, and overlay a virtual element on a display of a portion of the document corresponding to the selected portion of the object, wherein the virtual element is indicative of a correlation between the portion of the document and the selected portion of the object.

19. The augmented reality virtual personal assistant of claim 16, wherein the instructions are executable by one or more computing devices to detect human interaction with the document, interpret the human interaction, determine a suggestion relating to the multi-step activity in response to the human interaction, and output the suggestion on a view of the real-world scene.

20. The augmented reality virtual personal assistant of claim 16, wherein the instructions are executable by one or more computing devices to detect human interaction with the object in the real world environment, interpret the human interaction, determine a suggestion relating to the multi-step activity in response to the human interaction, and output the suggestion on a display of the document.

21. A method for augmented reality virtual personal assistance comprising, with at least one computing device:
 analyzing a video depicting a real-world scene of a multi-step activity;
 algorithmically detecting, at different time instants, visual features in the video, to identify a physical first object involved in the multi-step activity;
 automatically determining, from at least one of the algorithmic analysis of the video and a condition of physical objects detected during at least one of the different time instants, a current step of the multi-step activity;
 correlating an external representation of the first object detected in the video with the video depiction of the first object in the real-world scene, the external representation depicting the first object in a different context than the real-world scene;
 identifying, from a semantic interpretation of at least one of audio and video of the real-world scene or a semantic interpretation of the document, at least one portion of the external representation relevant to the current step of the multi-step activity;
 using information regarding the current step, automatically interpreting user input relating to the current step of the multi-step activity, wherein the user input comprises at least one of a human-computer interaction (HCI)), including at least one of a touch or a tap of a physical object on a display in operable communication with the at least one computing device or natural language speech, including a voice command;
 overlaying a portion of a real-world view of the first object with a virtual element indicative of the at least one relevant portion of the external representation and based on the interpreted user input;
 based on the at least one HCI or natural language speech:
 applying mapping to develop correlations that link respective intents of at least one HCI or natural language speech, and
 merging the correlations to develop a global input intent associated with the respective intents of the at least one HCI or natural language speech for a given time instant;
 and
 using the merged correlations, determining HCI that relate to objects in the video and natural language speech that refers to a particular section of the document.

22. The method of claim 21, comprising annotating a view of a portion of the external representation with a different virtual element indicative of the at least one relevant portion of the external representation.

23. The method of claim 21, comprising algorithmically detecting a second physical object in the video, determining a relationship between the second object and the first object, and overlaying a portion of a real-world view of the first and second objects with a virtual element indicative of the relationship between the second object and the first object.

24. The method of claim 21, wherein the first object is an operable device, the at least one relevant portion of the external representation comprises an animation of the operation of the device, and the method comprises overlaying a portion of the real world view of the device with the animation of the operation of the device.

25. The method of claim 21, comprising selecting an external representation of the first object that is indicative of a part-whole relationship between two or more components of the detected first object; and overlaying the real-world view of the first object with the selected portion of the external representation.

26. The method of claim 21, comprising correlating a plurality of different external representations of the detected first object with the video depiction of the first object in the real world scene, determining a virtual element corresponding to each of the different external representations, and dynamically changing the overlay to include different virtual elements corresponding to the different external representations.

27. The computing system of claim 16, wherein the instructions are executable by the one or more computing devices for communicating with an HCI device comprising at least one of a touchscreen display, a touch-sensitive keypad, a kinetic sensor, or an eye-tracking sensor, and for receiving from the HCI device at least one of gestures, taps, mouse clicks, keypad input, eye movement inputted to the HCI device.

28. The method of claim 21, further comprising communicating with an HCI device comprising at least one of a touchscreen display, a touch-sensitive keypad, a kinetic sensor, or an eye-tracking sensor, and receiving from the HCI device at least one of gestures, taps, mouse clicks, keypad input, eye movement inputted to the HCI device.

* * * * *